United States Patent

Itoyama et al.

[19]

[11] Patent Number: 6,167,342
[45] Date of Patent: Dec. 26, 2000

[54] CONTROL APPARATUS FOR INTERNAL COMBUSTION ENGINE AND ESTIMATION APPARATUS FOR ESTIMATING PRESSURE IN INTAKE AND DISCHARGE SYSTEM OF INTERNAL COMBUSTION ENGINE

[75] Inventors: Hiroyuki Itoyama; Hiroyuki Aizawa, both of Kanagawa-ken, Japan

[73] Assignee: Nissan Motor Co., Ltd., Kanagawa, Japan

[21] Appl. No.: 09/427,004

[22] Filed: Oct. 26, 1999

Related U.S. Application Data

[62] Division of application No. 08/867,980, Jun. 3, 1997, Pat. No. 6,012,431.

[30] Foreign Application Priority Data

| Jun. 3, 1996 | [JP] | Japan | 8-140303 |
| Jul. 9, 1996 | [JP] | Japan | 8-178919 |
| Sep. 30, 1996 | [JP] | Japan | 8-257241 |

[51] Int. Cl.$^7$ ................................................. F02D 41/18
[52] U.S. Cl. ........................................... 701/104; 123/676
[58] Field of Search ................................. 701/104, 102, 701/103, 110; 73/118.1, 118.2; 123/676

[56] References Cited

U.S. PATENT DOCUMENTS

| 4,450,825 | 5/1984 | Sekiguchi et al. . |
| 4,454,855 | 6/1984 | Otobe et al. . |
| 4,762,109 | 8/1988 | Jeenicke . |
| 5,205,260 | 4/1993 | Takahashi et al. ............... 123/494 |
| 5,515,833 | 5/1996 | Cullen et al. . |
| 5,520,161 | 5/1996 | Klopp . |
| 5,682,864 | 11/1997 | Shirakawa . |
| 5,771,688 | 6/1998 | Hasegawa et al. ............... 60/276 |
| 5,845,627 | 12/1998 | Olin et al. ............... 123/676 |
| 5,918,582 | 7/1999 | Itoyama et al. ............... 123/528.21 |

FOREIGN PATENT DOCUMENTS

| 1 601 538 | 10/1981 | Germany . |
| 57-86535 | 5/1982 | Japan . |
| 63-129157 | 6/1988 | Japan . |
| 63-143343 | 6/1988 | Japan . |
| 8-284735 | 10/1996 | Japan . |
| 2 042 770 | 9/1980 | United Kingdom . |
| 2 083 657 | 3/1982 | United Kingdom . |
| 2 279 698 | 1/1995 | United Kingdom . |

*Primary Examiner*—Henry C. Yuen
*Assistant Examiner*—Arnold Castro
*Attorney, Agent, or Firm*—McDermott, Will & Emery

[57] ABSTRACT

At least an engine speed, an opening of an accelerator and an amount of an intake air are detected as an engine operating condition. A standard volume for injecting fuel oil is calculated on the basis of at least the engine speed and the opening of the accelerator. A target injection timing of fuel is set on the basis of the engine speed and the standard volume for injecting fuel oil. An actual fuel injection timing is detected. A standard target EGR rate is calculated on the basis of the engine speed, the amount of the intake air and the standard volume for injecting fuel oil. An amount of adjustment of a target EGR rate is calculated on the basis of the standard volume for injecting fuel oil, the target fuel injection timing and the actual fuel injection timing. A final target EGR rate is set on the basis of the standard target EGR rate and the amount of adjustment. An EGR is controlled on the basis of the final target EGR rate.

4 Claims, 36 Drawing Sheets

STANDARD VOLUME FOR INJECTING FUEL OIL
CALCULATING FLOW CHART

STANDARD VOLUME FOR
INJECTING FUEL OIL MAP

TARGET INJECTION TIMING
SETTING FLOW CHART

EXAMPLE OF INJECTION
TIMING MAP

CALCULATE EGR VALVE TARGET OPENING AREA Aevf

- S61 — CALCULATE TARGET EGR AMOUNT
- S62 — READ IN INTAKE AIR PRESSURE Pm
- S63 — READ IN EXHAUST AIR PRESSURE Pexh
- S64 — $Cqe = \sqrt{K \times (Pexh - Pm)}$   K:CONSTANT
- S65 — $Aev = Tqek/Cqe$
- S66 — CALCULATE WEIGHT CONSTANT FOR EQUALIZING
- S67 — $Aevf = Aev/2^{Nlk} + (1 - 1/2^{Nlk}) \times Aevf_{n-1}$

END

INTAKE AIR AMOUNT DETECTING FLOW CHART

TABLE FOR CONVERSION BETWEEN VOLTAGE AND INTAKE AIR AMOUNT

TARGET EGR RATE CALCULATING FLOW CHART

MAP FOR TARGET EGR RATE (EXAMPLE)

TABLE FOR ADJUSTMENT BETWEEN TARGET EGR RATE AND WATER TEMPERATURE (EXAMPLE)

COMPLETE BURNING DETERMINATION FLOW CHART

ADJUSTMENT COEFFICIENT BETWEEN INJECTION TIMING ERROR AND EGR RATE CALCULATING FLOW CHART

EXAMPLE OF TABLE FOR ADJUSTING RATE OF INJECTION TIMING ERROR

FIG.50

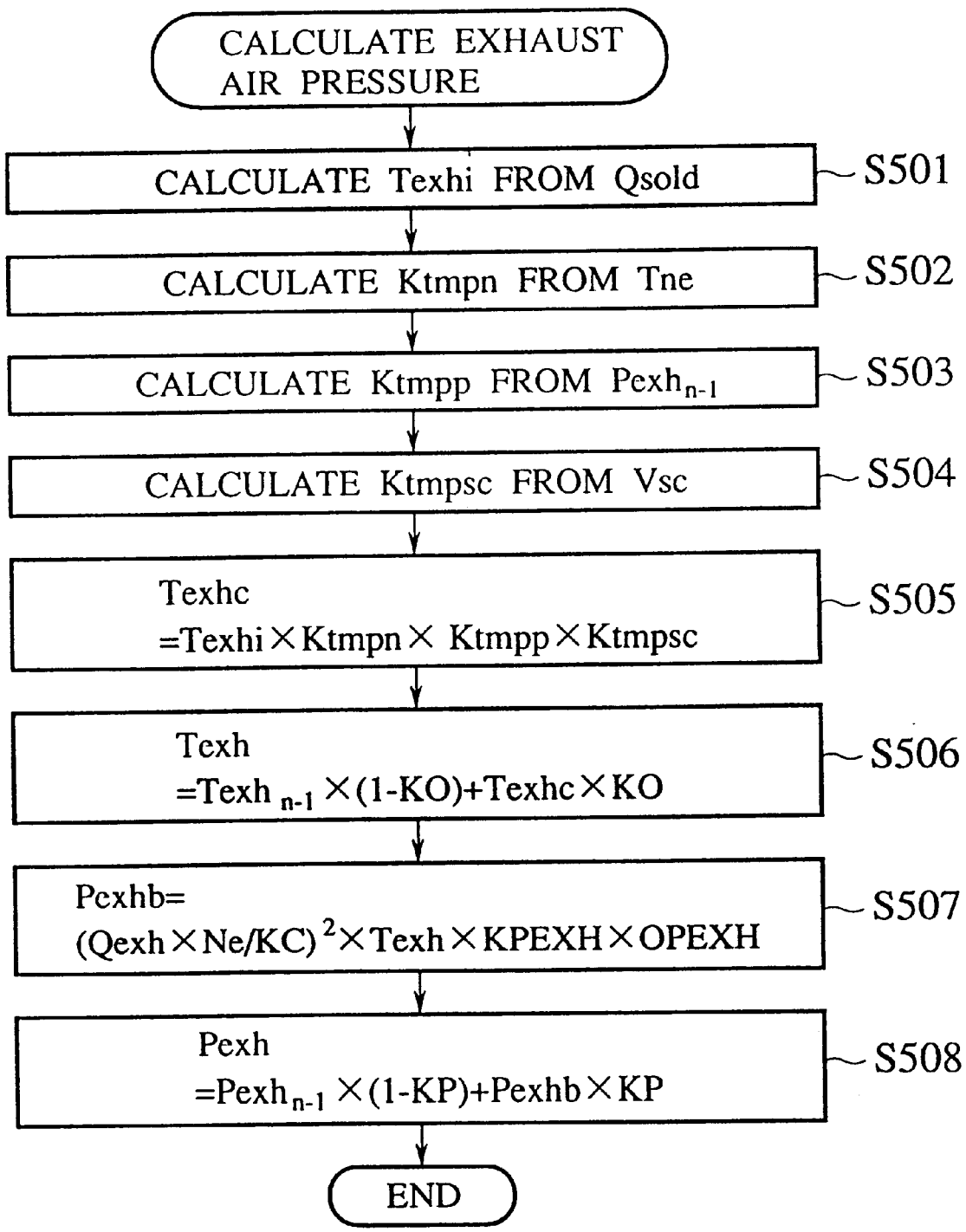

CALCULATE EXHAUST AIR PRESSURE

- S501: CALCULATE Texhi FROM Qsold
- S502: CALCULATE Ktmpn FROM Tne
- S503: CALCULATE Ktmpp FROM $Pexh_{n-1}$
- S504: CALCULATE Ktmpsc FROM Vsc
- S505: $Texhc = Texhi \times Ktmpn \times Ktmpp \times Ktmpsc$
- S506: $Texh = Texh_{n-1} \times (1-KO) + Texhc \times KO$
- S507: $Pexhb = (Qexh \times Ne/KC)^2 \times Texh \times KPEXH \times OPEXH$
- S508: $Pexh = Pexh_{n-1} \times (1-KP) + Pexhb \times KP$

END

CONTROL APPARATUS FOR INTERNAL COMBUSTION ENGINE AND ESTIMATION APPARATUS FOR ESTIMATING PRESSURE IN INTAKE AND DISCHARGE SYSTEM OF INTERNAL COMBUSTION ENGINE

This application is a divisional of application Ser. No. 08/867,980 filed June 3, 1997, now U.S. Pat. No. 6,012,431.

BACKGROUND OF THE INVENTION

1. Field of the Invention

The present invention relates to an exhaust gas recirculation (hereinafter referred to as EGR) control of an internal combustion engine, particularly to an EGR control technique of a diesel engine. Further the present invention relates to a control apparatus for controlling a volume for injecting fuel oil and an EGR amount in an internal combustion engine. Still further the present invention relates to a technique of estimating pressures in intake and discharge systems which are required for controlling the EGR of the internal combustion engine.

2. Description of the Related Art

Conventional EGR control methods of the internal combustion engine include, for example, a technique disclosed in Japanese Patent Application Laid-Open No.63-129157. The disclosed technique relates to a technique for adjusting EGR in accordance with errors in injection timings.

However, in the above described conventional EGR control method, a rate in which the EGR is adjusted is constant in every operation conditions. Since sensibility of the discharge air is actually different with respect to a load, a gain for adjusting is required to be changed in accordance with the load. However, the prior art can not satisfy this condition so that the EGR is too little in an operation condition or too much in another operation condition. Accordingly, it is difficult to obtain the best discharge of air.

Further, the conventional control apparatuses of the internal combustion engine include Japanese Patent Application Laid-Open No.57-86535 in which the maximum volume for injecting fuel oil (upper limit value of the volume for injecting fuel oil regularly calculated) is adjusted to be reduced under the operation of EGR. Japanese Patent Application Laid-Open No.63-143343 show another control apparatus in which the EGR is stopped together with adjusting to reduce the maximum volume for injecting fuel oil at a time of accelerating operation. These apparatuses are made in view of generation of smoke (PM) in the case that volume for injecting fuel oil is rapidly increased under much EGR amount. In these techniques, a standard value of the maximum volume for injecting fuel oil is set in accordance with the revolution speed of the engine and the like.

However, even if the maximum volume for injecting fuel oil is adjusted to be reduced in the above manner, in the case that the adjustment of the EGR is constantly operated due to the fact whether or not the EGR exists, the maximum volume for injecting fuel oil is not changed in spite of change of the EGR rate so that sufficient output can not be obtained because of insufficient throttling of injection quantity or the smoke is generated because of excessive throttling. Accordingly, it is difficult to obtain both of a good exhausting performance and a good driving performance.

Further, it is understood that when the amount for adjustment with respect to the maximum volume for injecting fuel oil is changed in accordance with a target EGR rate, since there is an air dynamics at a transient, the similar matter to the above mentioned matter occurs.

Still further, in conventional detecting methods of detecting pressures in intake and exhaust systems of the internal combustion engine, it is popular to provide a sensor for directly detecting the pressures. Further, there is a technique disclosed in Japanese Patent Application Laid-Open No.8-284735, in which the pressure is estimated by an output from an air flow meter and the like.

However, in the case that the sensor is provided in the above manner, high cost is required, and in the case of a sensor for detecting the exhaust pressure, since the exhaust gas is recirculated such as the EGR and the sensor is exposed to an high temperature atmosphere, it is very severe in durability. In the case of securing the durability, time constant of the sensor is extremely large and an accurate value can not be displayed in the transient so that it is difficult to feedback to the control.

Further, since the exhaust temperature affecting to the exhaust pressure is changed by parameters such as an injection timing and/or an air flow within an cylinder, the above described technique disclosed in Japanese Patent Application Laid-Open No.8-284735 can not achieve this problem.

SUMMARY OF THE INVENTION

The present invention is made by taking the above described conventional problems into consideration and an object of the present invention is to provide a technique of adjusting EGR in accordance with an amount of an error of an injection timing and a load when the injection error of the injection timing occurs. Another object of the present invention is to optimize a control of a volume for injecting fuel oil and an amount of EGR. Still another object of the present invention is to provide an estimation apparatus for accurately estimating pressures in an intake system and an exhaust system of an internal combustion engine by considering an injection timing and the like without using a sensor.

In order to achieve the above described object, there is provided a control apparatus for controlling an EGR in an internal combustion engine comprising: driving condition detecting means for detecting at least an engine speed, an opening of an accelerator and an amount of an intake air as an engine operating condition; standard volume for injecting fuel oil calculating means for calculating a standard volume for injecting fuel oil on the basis of at least the engine speed and the opening of the accelerator; target injection timing setting means for setting a target injection timing of fuel on the basis of the engine speed and the standard volume for injecting fuel oil; actual injection timing detecting means for detecting an actual fuel injection timing; standard target EGR rate calculating means for calculating a standard target EGR rate on the basis of the engine speed, the amount of the intake air and the standard volume for injecting fuel oil; target EGR rate adjustment amount calculating means for calculating an amount of adjustment of a target EGR rate on the basis of the standard volume for injecting fuel oil, the target fuel injection timing and the actual fuel injection timing; target EGR rate setting means for setting a final target EGR rate on the basis of the standard target EGR rate and the amount of adjustment; and EGR control means for controlling an EGR on the basis of the final target EGR rate.

In accordance with a preferred aspect of the present invention, the target EGR rate adjustment amount calculating means calculate the amount of adjustment on the basis of a difference between the target fuel injection timing and the actual fuel injection timing and on the basis of the standard fuel injection amount.

In accordance with a preferred aspect of the present invention, the target EGR rate adjustment amount calculating means is structured such that the amount of adjustment becomes large when the standard fuel injection amount becomes large.

In accordance with a preferred aspect of the present invention, the target EGR rate adjustment amount calculating means is structured such as to determine an EGR rate adjustment coefficient in accordance with a following equation and to calculate the amount of adjustment base on the EGR rate adjustment coefficient:

$$Kegrit = (1-Regd) \times KEIT\# \times Qf/QFB\#$$

in this equation, Kegrit means an EGR rate adjustment coefficient, Regd means an adjustment rate with respect to an injection timing error, KEIT# means an adjustment gain in a standard injection amount QFB# (constant), Qf means a volume for injecting fuel oil and QFB# means a standard injection amount (constant).

Further, in order to achieve the above described object, there is provided a control apparatus for an internal combustion engine comprising: driving condition detecting means for detecting at least an engine speed, an opening of an accelerator, an amount of an intake air and an EGR amount as an engine operating condition; standard volume for injecting fuel oil calculating means for calculating a standard volume for injecting fuel oil on the basis of at least the engine speed and the opening of the accelerator; maximum volume for injecting fuel oil calculating means for calculating a possible maximum volume for injecting fuel oil on the basis of the amount of intake air and the EGR amount; volume for injecting fuel oil setting means for setting a final volume for injecting fuel oil by comparing the standard volume for injecting fuel oil and the maximum volume for injecting fuel oil and selecting the smaller one; volume for injecting fuel oil control means for controlling a volume for injecting fuel oil to the engine in accordance with the final volume for injecting fuel oil; standard target EGR rate calculating means for calculating a standard target EGR rate on the basis of the engine speed, the amount of the intake air and the standard volume for injecting fuel oil; target EGR rate adjusting means for adjusting the standard target EGR rate to 0 when the opening of the accelerator is not less than a predetermined value so as to obtain a target EGR rate; and EGR amount control means for controlling an amount of the EGR in accordance with the target EGR rate.

In accordance with the present invention, since the maximum volume for injecting fuel oil is optimized and set by setting the maximum volume for injecting fuel oil on the basis of the amount of intake air and EGR amount and the EGR is stopped when the opening of the accelerator is not less than the predetermined value, both good exhaust performance and driving performance can be obtained in controlling the volume for injecting fuel oil and the EGR amount.

In accordance with a preferred aspect of the present invention, the target EGR rate adjusting means calculates the predetermined value on the basis of the engine speed.

In this aspect, the EGR can be certainly stopped in acceleration taking the engine speed into consideration.

Still further, in order to achieve the above described object, as shown in FIG. 19, there is provided a control apparatus for an internal combustion engine comprising: driving condition detecting means for detecting at least an engine speed, an opening of an accelerator, an amount of an intake air and an EGR amount as an engine operating condition; standard volume for injecting fuel oil calculating means for calculating a standard volume for injecting fuel oil on the basis of at least the engine speed and the opening of the accelerator; maximum volume for injecting fuel oil calculating means for calculating a possible maximum volume for injecting fuel oil on the basis of the amount of intake air and the EGR amount; volume for injecting fuel oil setting means for setting a final volume for injecting fuel oil by comparing the standard volume for injecting fuel oil and the maximum volume for injecting fuel oil and selecting the smaller one; volume for injecting fuel oil control means for controlling a volume for injecting fuel oil to the engine in accordance with the final volume for injecting fuel oil; standard target EGR rate calculating means for calculating a standard target EGR rate on the basis of the engine speed, the amount of the intake air and the standard volume for injecting fuel oil; target EGR rate adjusting means for adjusting the standard target EGR rate in accordance with at least rate of the maximum volume for injecting fuel oil with respect to the standard volume for injecting fuel oil so as to obtain a target EGR rate; and EGR amount control means for controlling an amount of the EGR in accordance with the target EGR rate.

In accordance with the present invention, since the maximum volume for injecting fuel oil is optimized and set by setting the maximum volume for injecting fuel oil on the basis of the amount of intake air and EGR amount and the EGR amount is adjusted to be reduced on the basis of the adjustment degree of the volume for injecting fuel oil to reduced side by adjusting the target EGR rate in accordance with the rate of the final volume for injecting fuel oil with respect to the standard volume for injecting fuel oil, both good exhaust performance and driving performance can be obtained in controlling the volume for injecting fuel oil and the EGR amount.

Further, even when the maximum volume for injecting fuel oil is reduced in the case that the amount of intake air is reduced in a high ground, generation of smoke can be prevented.

In accordance with a preferred aspect of the present invention, the target EGR rate adjusting means obtains the target EGR rate by adjusting the standard target EGR rate in accordance with the rate of the maximum volume for injecting fuel oil with respect to the standard volume for injecting fuel oil and the opening of the accelerator.

In this aspect, the target EGR rate can be adjusted to be reduced the larger the opening becomes, taking the opening of the accelerator into consideration.

In accordance with a preferred aspect of the present invention, the target EGR rate adjusting means obtains the target EGR rate adjusting the standard target EGR rate in accordance with the rate of the maximum volume for injecting fuel oil with respect to the standard volume for injecting fuel oil and the acceleration degree.

In accordance with this aspect, the target EGR rate can be adjusted to be reduced the more rapidly the acceleration is, taking the acceleration degree into consideration.

In accordance with a preferred aspect of the present invention, the target EGR rate adjusting means calculates the acceleration degree by a changing degree of the opening of the accelerator.

In accordance with this aspect, the acceleration degree can be appropriately grasped by the changing degree of the opening of the accelerator.

In accordance with a preferred aspect of the present invention, the target EGR rate adjusting means calculates the acceleration degree by changing degree of vehicle speed.

In accordance with this aspect, the acceleration degree can be appropriately grasped by the changing of the vehicle speed.

In accordance with a preferred aspect of the present invention, the maximum volume for injecting fuel oil calculating means is structured such as to calculate the maximum volume for injecting fuel oil in accordance with a following equation:

$$Qful = ((Qas0/Ne) \times KC + Qec \times KOR)/(Klamb \times 14.7)$$

in this equation, Qful means a maximum volume for injecting fuel oil, Qas0 means an amount of intake air, Ne means an engine speed, Qec means an amount of an EGR, Klamb means a critical air excess rate and KC and KOR means constant.

In accordance with this aspect, reliability of setting the maximum volume for injecting fuel oil can be greatly improved.

Furthermore, in order to achieve the above described object, as shown in FIG. 35, there is provided an estimating apparatus for estimating a pressure in an exhaust system for an internal combustion engine comprising: volume for injecting fuel oil detecting means for detecting an injecting amount of a fuel injected to the engine; intake air temperature detecting means for detecting a temperature of an air sucked to the engine; fuel injection timing detecting means for detecting an injection timing of the fuel; intake air flow detecting means for detecting a flow of the intake air; engine speed detecting means for detecting an engine speed; and exhaust system pressure estimating means for estimating a pressure in an exhaust system on the basis of the volume for injecting fuel oil, the intake air temperature, the fuel injection timing, the intake air flow and the engine speed.

In accordance with the present invention, since a calorific value is determined by a volume for injecting fuel oil detected by the volume for injecting fuel oil detecting means, a standard exhaust temperature can be defined. Since the combustion temperature is changed due to the change of the temperature of the intake, the temperature of the exhaust air is changed. Further, when the injection timing is advanced (an advance value is made large) in the injection timing of the fuel, combustion state is improved and the temperature in discharging the cylinder is lowered so that the temperature in the exhaust air is lowered, while when the injection timing is delayed, the temperature in the exhaust air rises in the inverse manner of the above case. Accordingly, the present invention can effect the temperature in the exhaust air.

Thus, the temperature in the exhaust air can be accurately estimated on the basis of the volume for injecting fuel oil, the temperature in the intake air and the fuel injection timing.

In contrast of this, the exhaust flow volume can be determined on the basis of the intake air flow volume and the engine speed. In a stationary state, the intake air volume (at a unit hour) substantially equals to an exhaust air volume discharged from the cylinder, however, in a transient state, is different due to the volume and the like in the intake system. Thus, after the exhaust volume per a cycle discharged from the cylinder is determined on the basis of the intake air flow volume and the engine speed, the exhaust volume is again converted to the exhaust flow volume (at a unit hour) discharged from the cylinder by using the engine speed so that the exhaust flow volume can be accurately calculated.

Then, the pressure in the exhaust air can be determined by using Bernoulli's equation on the basis of the estimated temperature in the exhaust air and calculated volume of the exhaust flow.

In accordance with a preferred aspect of the present invention, the exhaust system pressure estimating means calculates the standard exhaust temperature on the basis of the volume for injecting fuel oil, calculates the temperature in the exhaust air discharged from the cylinder by adjusting the standard exhaust temperature by the temperature in the intake air, the preceding estimated pressure in the exhaust system and the fuel injection timing and estimates the pressure in the exhaust system on the basis of the exhaust air flow volume determined by the intake air volume and the engine speed and the temperature in the exhaust air discharged from the cylinder.

In accordance with this aspect, as mentioned above, the standard exhaust temperature is determined on the basis of the volume for injecting fuel oil and the temperature in the exhaust air is estimated by adjusting the standard exhaust temperature by the intake air volume, the preceding estimated pressure in the exhaust system and the fuel injection timing. Since, due to abiabatic change, the temperature in the exhaust air rises at a predetermined rate when the pressure in the exhaust system rises, adjustment by using the preceding estimated pressure in the exhaust system is performed at the same time, thereby estimating the temperature in the exhaust temperature more precisely.

The pressure in the exhaust system can be estimated on the basis of the volume of the exhaust flow determined by the intake air volume and the engine speed and the temperature in the exhaust air.

Further, in order to achieve the above described object, as shown in FIG. 36, there is provided an estimating apparatus for estimating a pressure in an exhaust system for an internal combustion engine comprising: volume for injecting fuel oil detecting means for detecting an injecting amount of a fuel injected to the engine; intake air temperature detecting means for detecting a temperature of an air sucked to the engine; swirl control state detecting means for detecting a swirl control state by a swirl control valve provided in an exhaust system of the engine; intake air flow detecting means for detecting a flow of the intake air; engine speed detecting means for detecting an engine speed; and exhaust system pressure estimating means for estimating a pressure in an exhaust system on the basis of the volume for injecting fuel oil, the intake air temperature, the swirl control state, the intake air flow and the engine speed.

In accordance with the present invention, since a swirl strength is controlled by the swirl control valve in the structure provided with the swirl control valve in the intake air system, by which combustibility is changed, the temperature in the exhaust air is changed. In this structure, the temperature in the exhaust air is estimated by detecting the swirl control state by the swirl control valve and taking the swirl control state in addition to the volume for injecting fuel oil and the temperature in the intake air into consideration. The temperature in the exhaust air may be estimated by adding the injection timing as the element for estimation, in this case, the accuracy in estimation is further improved.

The pressure in the exhaust system can be accurately estimated on the basis of the temperature in the exhaust air estimated in such an accurate manner, the temperature in the intake air and the exhaust flow volume determined by the engine speed.

In accordance with a preferred aspect of the present invention, the exhaust system pressure estimating means calculates the standard exhaust temperature on the basis of the volume for injecting fuel oil, calculates the temperature in the exhaust air discharged from the cylinder by adjusting the standard exhaust temperature by the temperature in the intake air, the preceding estimated pressure in the exhaust system and the swirl control state and estimates the pressure in the exhaust system on the basis of the exhaust air flow volume determined by the intake air volume and the engine speed and the temperature in the exhaust air discharged from the cylinder.

In accordance with this aspect, the standard exhaust temperature in accordance with the calorific value is determined by the volume for injecting fuel oil at the time of fuel injection and the temperature in the exhaust air is accurately estimated by adjusting the standard exhaust temperature by the intake air temperature, the preceding estimated pressure in the exhaust system and the swirl control state.

In accordance with a preferred aspect of the present invention, the adjustment by using the swirl control state in the standard exhaust temperature is performed by an adjustment coefficient set by the opening degree of the swirl control valve and the engine speed.

When the opening degree of the swirl control valve is large, the swirl gives only a small effect to all the range in changing the engine speed, however, when the opening degree of the swirl control valve is small, in the low speed range, the combustibility is improved due to a suitable swirl generation so that the temperature in the exhaust air falls and in contrast with this, in the high speed range, the combustibility is reduced due to excess swirl strength and he intake air volume to the cylinder is reduced by throttling effect so that the temperature in the exhaust air is increased.

Then, the adjustment coefficient of the temperature in the exhaust air is set on the basis of the opening of the swirl valve and the engine speed and the temperature in the exhaust air is adjusted by using the adjustment coefficient, thereby improving the accuracy in estimating the temperature in the exhaust air.

In accordance with a preferred aspect of the present invention, the adjustment by using the swirl control state in the standard exhaust temperature is performed by an adjustment coefficient set on the basis of a swirl flow speed correspondence value calculated by the intake air volume, the opening degree of the swirl control valve and the engine speed.

In accordance with this aspect, the intake air volume at a time of being sucked to the cylinder can be calculated by using the intake air volume and the engine speed and the intake air volume to the cylinder is divided by the opening degree of the swirl control valve so that the value corresponding to the swirl flow speed can be determined. When the swirl flow speed is a certain value, the combustibility is best improved to fall the temperature in the exhaust air, and when the swirl flow speed is over the certain value or below the certain value, the combustibility tends to be reduced to rise the temperature in the exhaust air.

Then, the adjustment coefficient of the temperature in the exhaust air is set on the basis of the swirl flow speed correspondence value calculated by the intake air volume, the opening of the swirl valve and the engine speed and the temperature in the exhaust air is adjusted by using the adjustment coefficient, thereby further improving the accuracy in estimating the temperature in the exhaust air.

Still further, in order to achieve the above described object, as shown in FIG. 37, the present invention provides an estimating apparatus for estimating a pressure in an intake system for an internal combustion engine comprising: intake air flow volume detecting means for detecting an air flow volume sucked to the engine; engine speed detecting means for detecting an engine speed; intake air temperature detecting means for detecting a temperature of the intake air; and intake system pressure estimating means for estimating a pressure in an intake system on the basis of the intake air flow volume, the engine speed and the intake air temperature.

In accordance with the present invention, since the volume of (mass) air at a intake stroke to the cylinder is determined on the basis of the intake air flow volume and the engine speed and a value corresponding to a volumetric efficiency in the case of constant temperature can be determined on the basis of the intake air volume to the cylinder and the engine speed, a value corresponding to a volumetric efficiency in accordance with the temperature in the intake air can be determined by adjusting the value by the temperature in the intake air.

Then, since the volume of air sucked to the cylinder is determined by the value corresponding to a volumetric efficiency and the cylinder volume, the pressure in the intake system can be estimated by using an equation of state on the basis of the volume and the temperature in the intake air.

In accordance with a preferred aspect of the invention, the intake system pressure estimating means calculates an intake air volume per a cylinder on the basis of the intake air flow volume and the engine speed, calculates a standard value corresponding to a volumetric efficiency on the basis of the intake air volume per a cylinder and the engine speed, calculates the value corresponding to a volumetric efficiency by adjusting the standard volumetric efficiency correspondence value by the intake air temperature, and estimates the pressure in the intake system on the basis of the intake air volume per a cylinder and the volumetric efficiency correspondence value by using a following equation:

$$Pm = Qac/Kin \times TA \times RA \times VCYL$$

in which Pm means a pressure in the intake system, Qac means an intake air volume per a cylinder, Kin means a corresponding value to a volumetric efficiency, TA means a temperature in a standard state, RA means a constant of air and gas and VCYL means a cylinder volume.

In accordance with this aspect, a pressure in the intake system can be further accurately estimated.

The nature, principle and utility of the invention will become more apparent from the following detailed description when read in conjunction with the accompanying drawings.

BRIEF DESCRIPTION OF THE DRAWINGS

In the accompanying drawings:

FIG. 50 is a flow chart showing procedures for calculating an exhaust air pressure;

DESCRIPTION OF THE PREFERRED EMBODIMENTS

A control apparatus for controlling an EGR in an internal combustion engine will be explained below with reference to the drawings.

Figure 1:
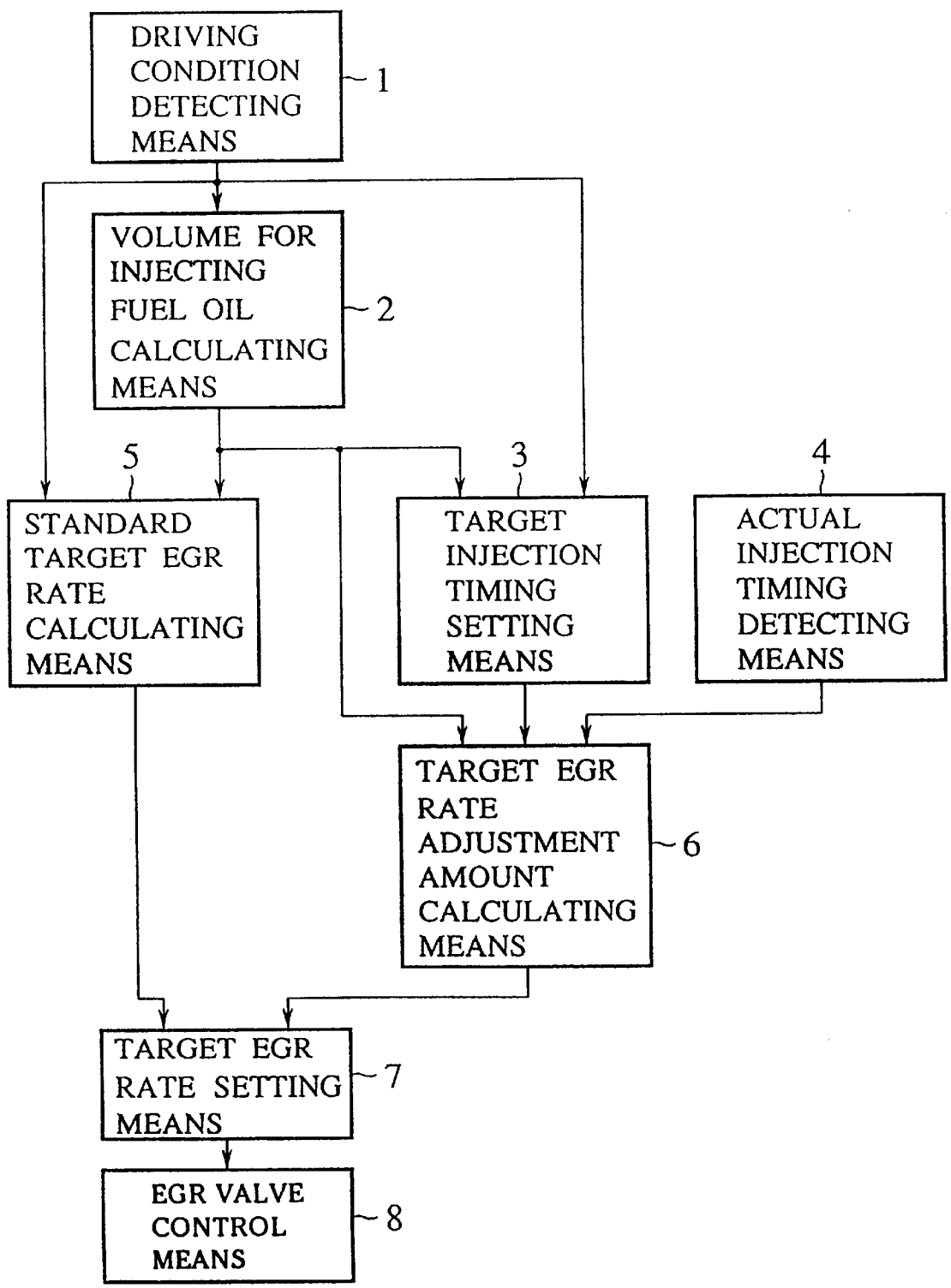
FIG. 1 is a standard block diagram of an EGR control apparatus for an internal combustion engine in accordance with the present invention.

FIG. 1 is a block diagram which shows a structure of the present invention.

At first, the structure will be explained. The EGR control apparatus in accordance with the present invention comprises driving condition detecting means 1 for detecting an engine speed, an opening of an accelerator and an engine operating condition such as a water temperature, volume for injecting fuel oil calculating means 2 for calculating a volume for injecting fuel oil as a standard amount by outputs from the driving condition detecting means 1, target injection timing setting means 3 for setting a target injection timing of fuel by outputs from the driving condition detecting means 1 and the volume for injecting fuel oil calculating means 2, actual injection timing detecting means 4 for detecting an actual fuel injection timing, standard target EGR rate calculating means 5 for calculating a standard target EGR rate by outputs from the driving condition detecting means 1 and the volume for injecting fuel oil calculating means 2, target EGR rate adjustment amount calculating means 6 for calculating an amount of adjustment of a target EGR rate by outputs from the volume for injecting fuel oil calculating means 2, the target injection timing setting means 3 and the actual injection timing detecting means 4, adjusted target EGR rate setting means 7 for setting a adjusted target EGR rate by outputs from the standard target EGR rate calculating means 5 and the target EGR rate adjustment amount calculating means 6, and EGR are control means 8 for controlling an EGR valve by outputs from the adjusted target EGR rate setting means 7.

Next, an operation of the EGR control apparatus having the above structure will be explained.

FIGS. 2 to 18 show flow charts in accordance with a preferred embodiments of the present invention and tables and maps required for them.

Figure 2:
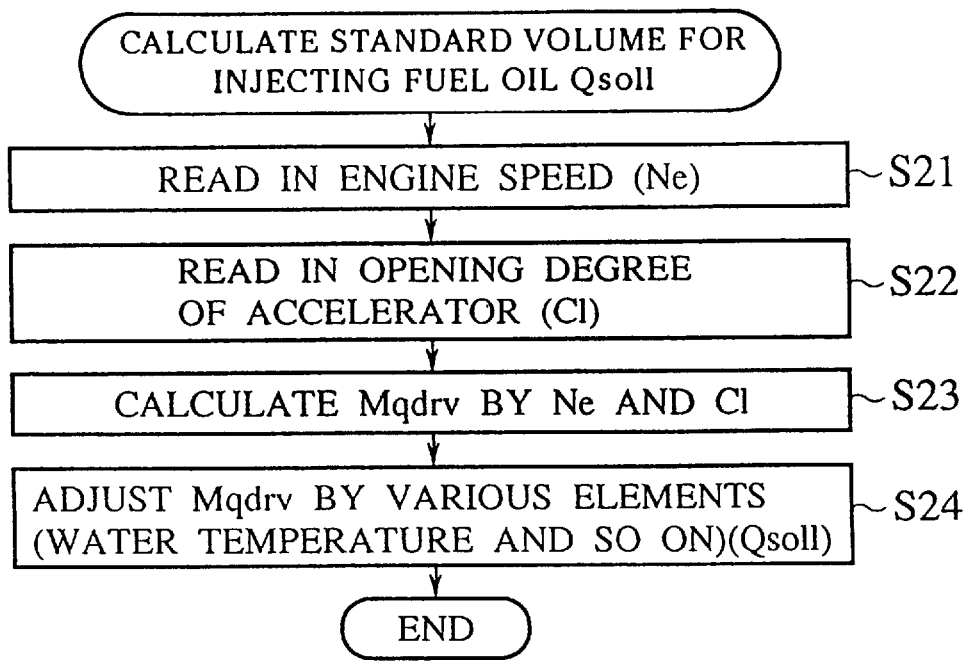
FIG. 2 is a flow chart showing procedures for calculating a standard volume for injecting fuel oil.

FIG. 2 is a flow chart for calculating a standard volume for injecting fuel oil and this operation is performed in a synchronized timing with the engine speed by making a signal from a sensor for a crank angle a trigger. This flow chart corresponds to the standard volume for injecting fuel oil calculating means.

In a step S21, an engine speed Ne which is calculated on the basis of a cycle of a signal from a sensor for sensing a crank angle is read in.

In a step S22, an opening degree Cl of an accelerator which is detected on the basis of a signal from a sensor for sensing an opening degree of the accelerator is read in.

Figure 3:
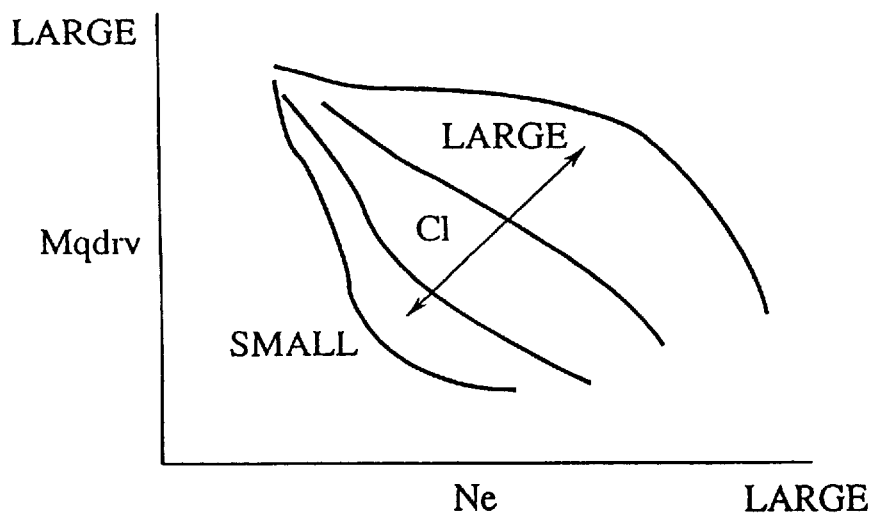
FIG. 3 is a drawing showing a map for the standard volume for injecting fuel oil.

In a step S23, a standard volume for injecting fuel oil Mqdrv is set by the engine speed Ne and the accelerator opening degree Cl with reference to a map for a standard volume for injecting fuel oil as shown in FIG. 3.

In a step S24, various adjustments including a water temperature adjustment are performed with respect to the standard volume for injecting fuel oil Mgdrv, thereby obtaining an adjusted standard volume for injecting fuel oil Qsoll and an operation is completed.

Figure 4:
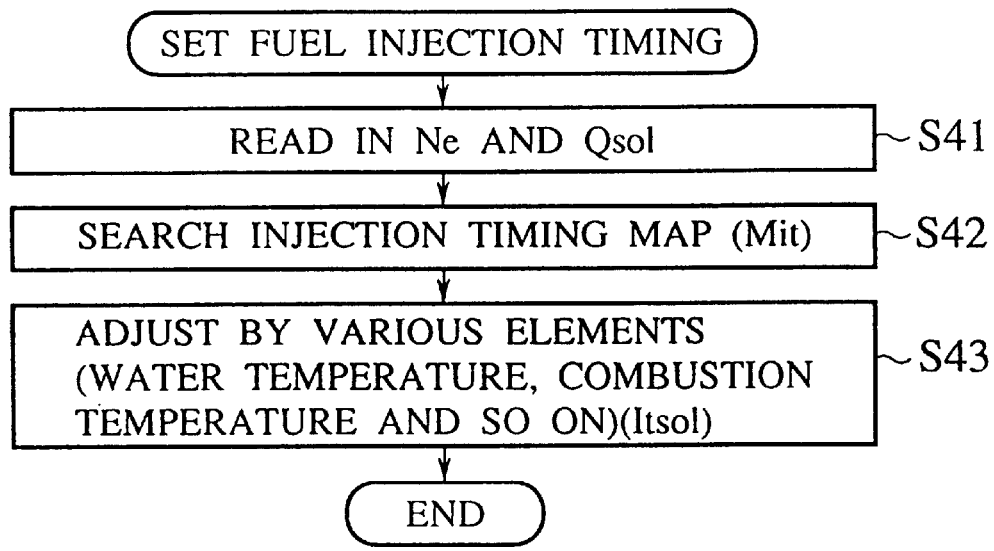
FIG. 4 is a flow chart showing procedures for setting a fuel injection timing.

FIG. 4 is a flow chart for setting a fuel injection timing.

Figure 5:
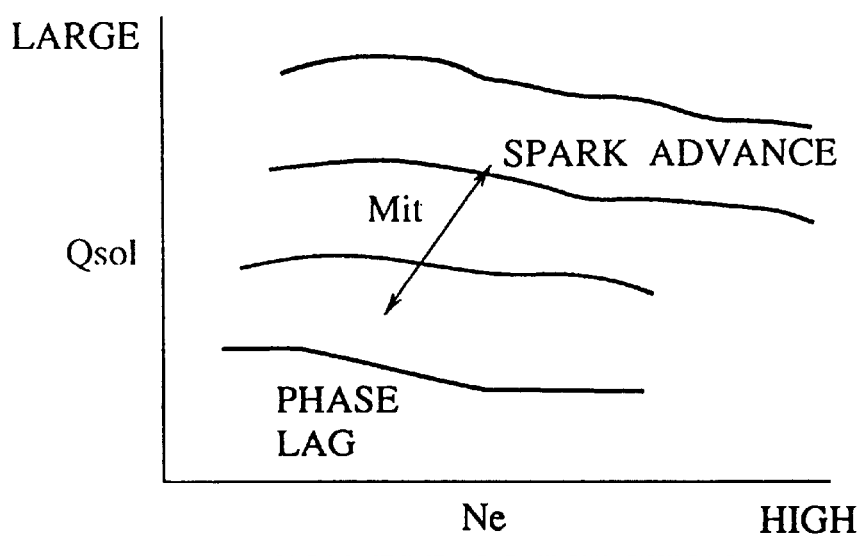
FIG. 5 is a drawing showing a map for the injection timing.

In a step S41, the engine speed Ne and the adjusted volume for injecting fuel oil Qsoll are read in and in a step S42, a standard fuel injection timing Mit is calculated from, for example, a map for an injection timing as shown in FIG. 5. In a step S43, various adjustments are performed to the standard fuel injection timing. Mit, thereby setting a final target injection timing Itsol and an operation is completed.

Figure 6:
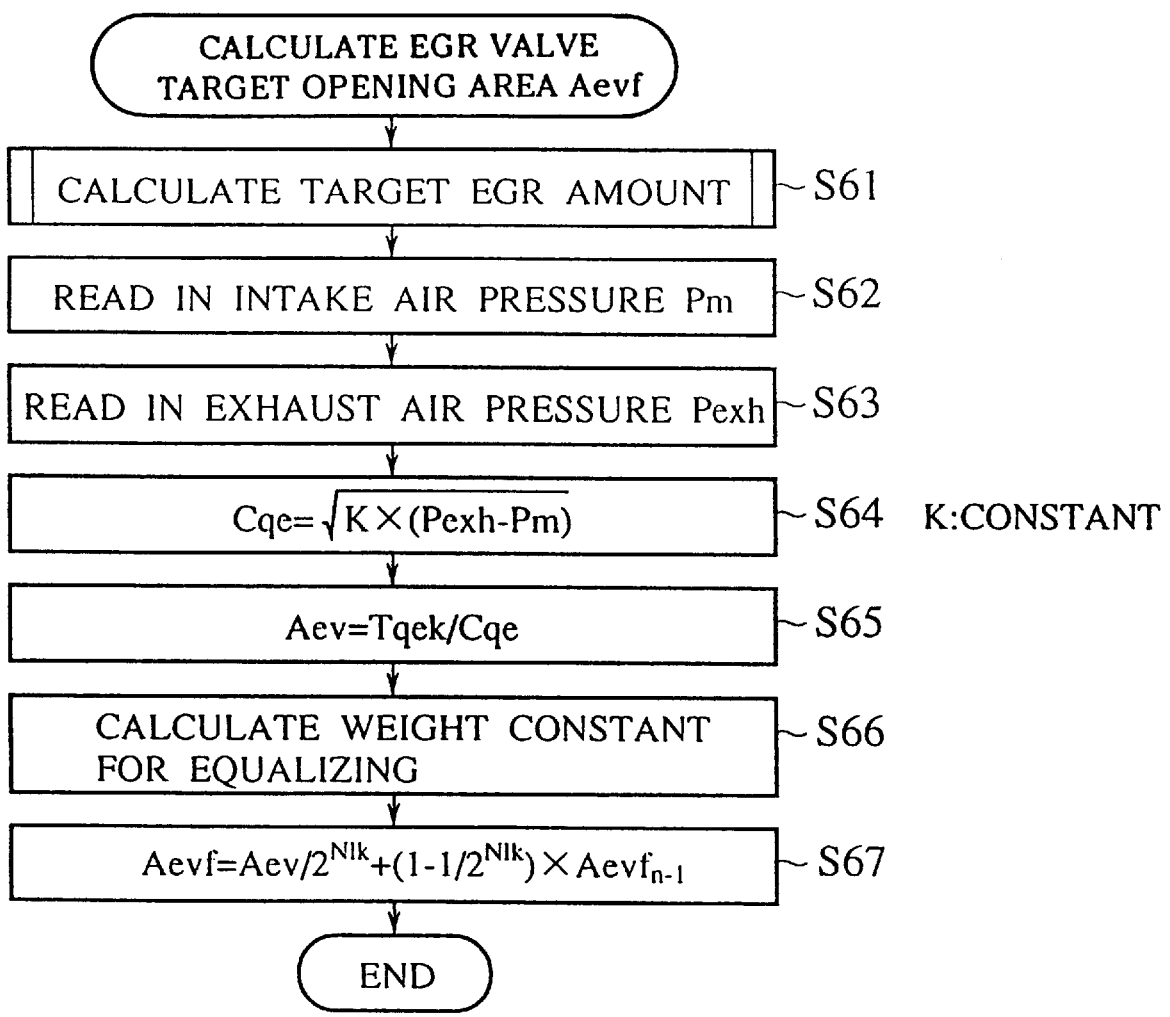
FIG. 6 is a flow chart showing procedures for calculating an target opening area of the EGR valve.

FIG. 6 is a flow chart for calculating an target opening area of the EGR valve.

In a step S61, a target EGR amount is calculated. This method is described hereinafter.

In a step S62, an intake pressure Pm is read in from a sensor for sensing an intake pressure and in a step S63, an exhaust pressure Pexh is read in from a sensor for sensing an exhaust pressure.

In a step S64, a value Cqe corresponding to an EGR flow speed is calculated by using the shown equation (Cqe={K(Pexh−Pm)}$^{1/2}$ in which K is a constant) and in a step S65, an opening area of the EGR valve Aev is calculated from the shown equation (Aev=Tqek/Cqe) by using a required EGR amount Tqek and the EGR flow speed corresponding value Cqe.

Figure 7:
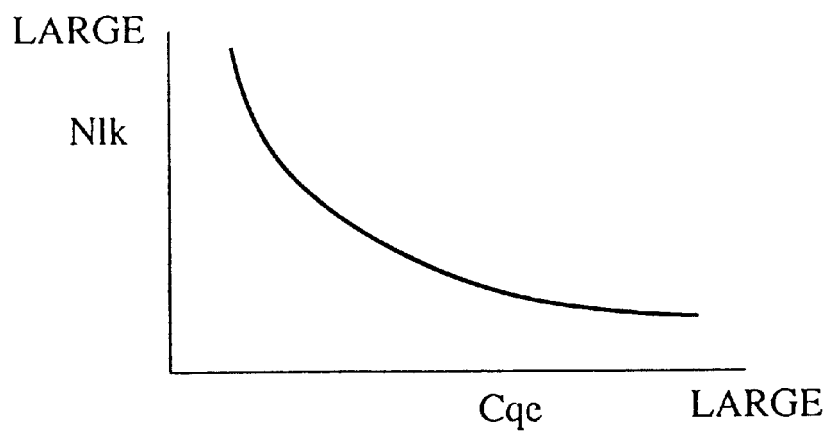
FIG. 7 is a graph showing a relation between a value corresponding to an EGR flow speed and a weight constant.
Figure 8:
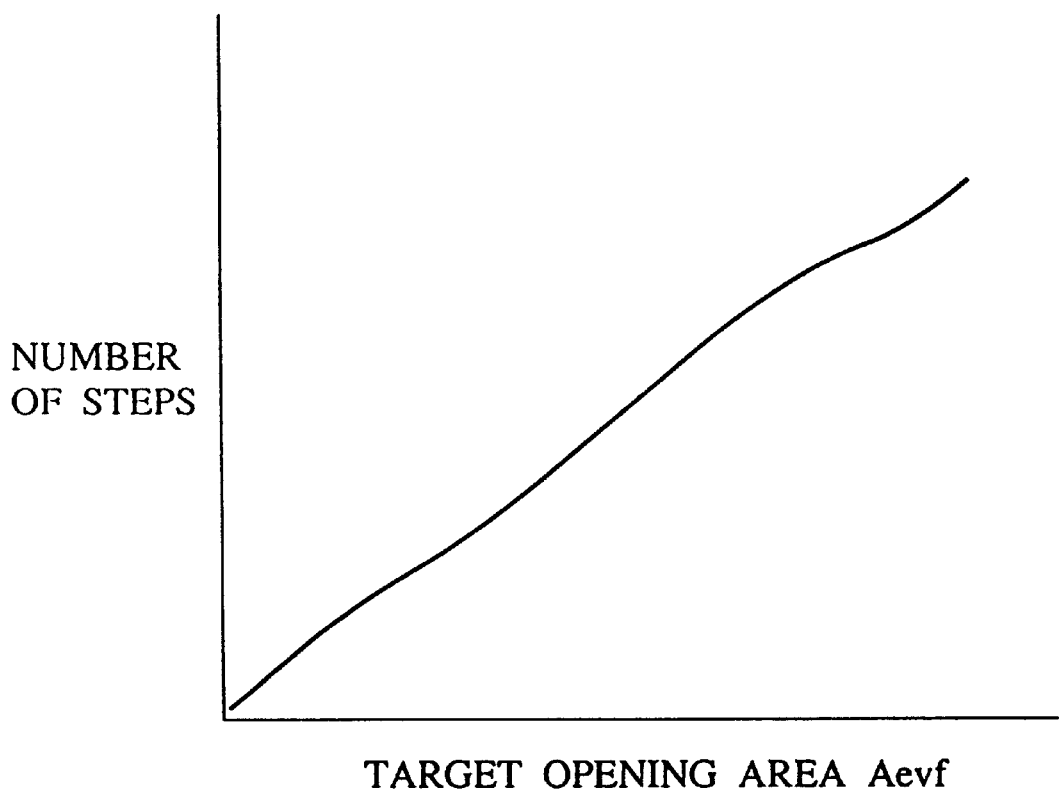
FIG. 8 is a graph showing an actuator characteristic.

In a step S66, a weight constant Nlk for performing a weighted average operation of the opening area of the EGR valve described hereinafter is searched by the EGR flow speed corresponding value Cqe by using a table shown in FIG. 7. In this case, the weight constant Nlk is set large when the EGR flow speed corresponding value Cqe is small and the weight constant Nlk is set small when the EGR flow speed corresponding value Cqe is large. This is because when the flow speed is small, the required opening area should be changed largely so that it is difficult to obtain a stable operation even if the flow speed is slightly changed so that the weighted average value is set to be much (heavy). While when the flow speed is large, an inverse phenomenon occurs, that is, since the flow speed generally becomes large (a differential pressure between an intake pressure and an exhaust pressure is large) in a transition period, it is desirable not to perform a weighted average operation due to a following characteristic in a transition period so that the weighted average constant is set to be small. In this case, a characteristic like an inverse proportion is applied because the flow speed has a characteristic of a square root. with respect to the differential pressure as shown in the equation in the step S64 so that the weighted average constant is required to be an inverse number thereof.

In a step S67, a weighted average operation is performed to the opening area Aev determined in the step S65 by the following equation by using the weight constant Nlk searched in the step S66, the result is determined as a target EGR valve opening area Aevf and the operation is completed.

$$Aevf = Aev/2^{Nlk} + (1 - 1/2^{Nlk}) \times Aevf_{n-1}$$

In this case, the equations in the steps S64 and S65 are those in a theoretical state. To an actual EGR valve driving apparatus, the target opening area Aevf is converted to a command value by an actuator characteristic shown in FIG. 8.

Figure 9:
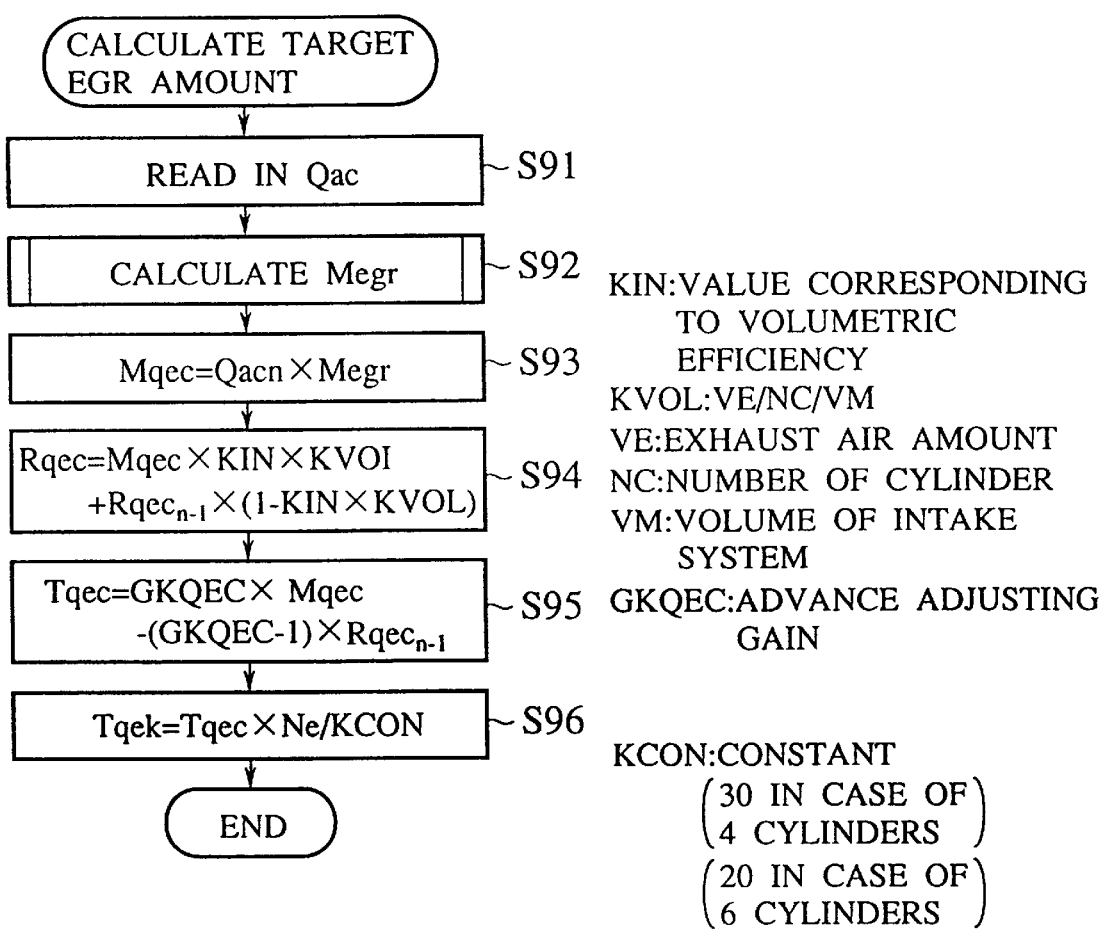
FIG. 9 is a flow chart showing procedures for calculating a target EGR value.

FIG. 9 is a flow chart for calculating the target EGR amount and the amount is calculated at a timing of the engine revolution or the corresponding timing.

In a step S91, an amount Qac of an intake air to the cylinder is read in.

In a step S92, an adjusted target EGR rate Megr is calculated.

In a step S93, a target EGR amount Mqec for an intake stroke is calculated by using the shown equation (Mqec=Qac×Megr).

In a step S94, an intermediate variable Rqec is calculated by using the following equation.

$$Rqec = Mqec \times KIN \times KVOl + Rqec_{n-1}(1 - KIN \times KVOl)$$

in which KIN means a volumetric efficiency corresponding value, KVOl=VE/NC/VM, VE means an exhaust air amount, NC means the number of engine cylinders and VM means a volume in the intake system.

In a step S95, an advance adjustment operation is performed in accordance with the following equation and the result is determined as Tqec. This equation corresponds to a simplified equation for a normal advance operation.

$$Tqec = GKQEC \times Mqec - (GKQEC - 1) \times Rqec_{n-1}$$

In a step S96, the target EGR amount Tqec after the advance operation is converted into a target EGR amount Tqek per a unit time period by using the following equation and the operation is completed.

$$Tqek = Tqec \times Ne/KCON$$

Figure 10:
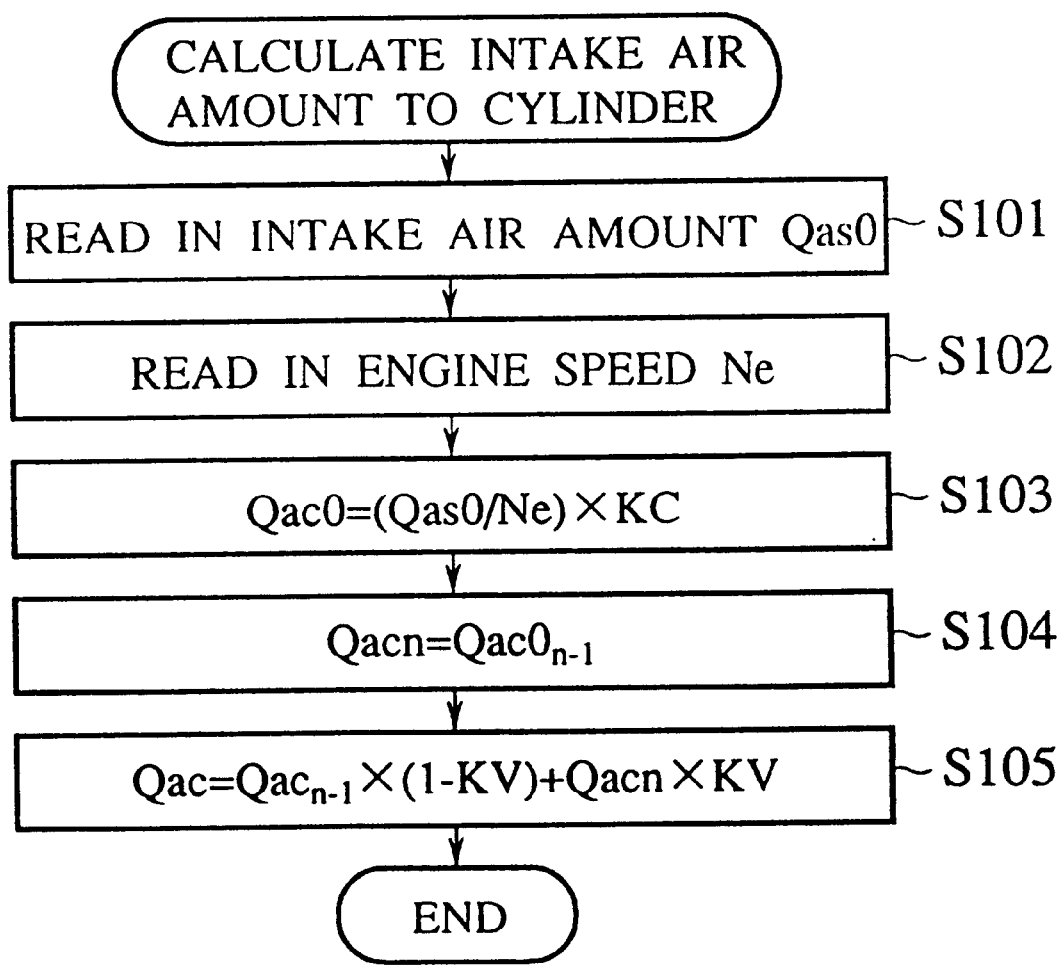
FIG. 10 is a flow chart showing procedures for calculating an intake air volume sucked to a cylinder.

FIG. 10 is a flow chart for calculating an intake air mount to the cylinder (the air amount sucked to the cylinder) and the calculation is performed at a timing corresponding to the engine revolution.

In a step S101, an intake air amount Qas0 is read in.

In a step S102, the engine speed Ne is read in.

In a step S103, the intake air amount Qas0 is converted into an intake air amount Qac0 per an intake stroke by using the following equation.

$$Qac0=(QasO/Ne) \times KC$$

in which KC is a constant.

In a step S104, a delay operation in correspondence to a feed delay from an air flow meter to a collector is performed by using the following equation. Accordingly, a value $Qac0_{n-L}$ which corresponds to a Qac0 L times before is read out and this is defined as Qacn.

$$Qacn=Qac0_{n-L}$$

in which L is a constant.

In step S105, a delay operation in correspondence to a dynamics within the collector is performed by using the following equation, thereby obtaining an intake air amount to the cylinder Qac and the operation is completed.

$$Qac=Qac_{n-1} \times (1-KV) + Qacn \times KV$$

in which KV is a constant.

Figure 11:
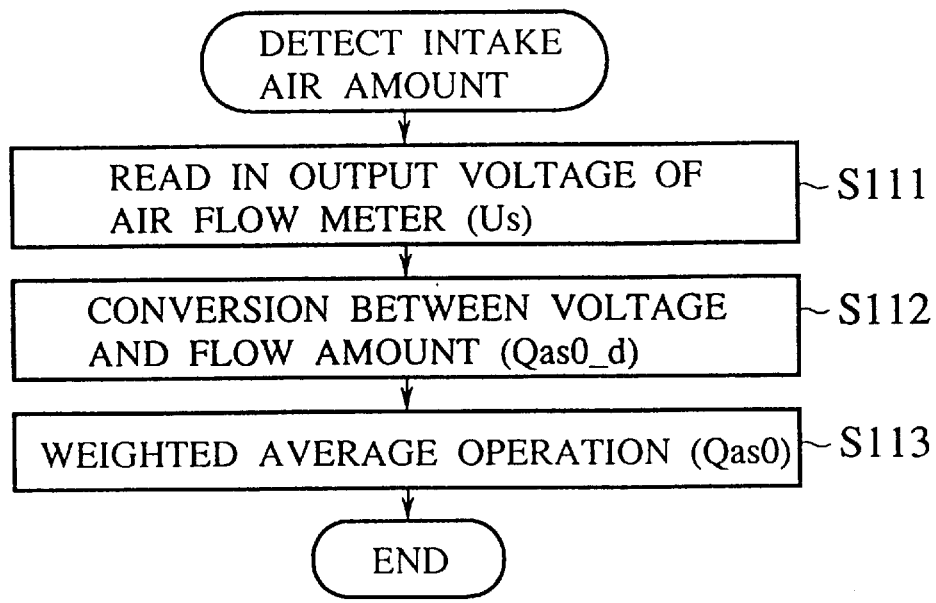
FIG. 11 is a flow chart showing procedures for calculating an intake air volume.

FIG. 11 is a flow chart for calculating the intake air amount Qas0, which is calculated every 4 millisecond.

Figure 12:
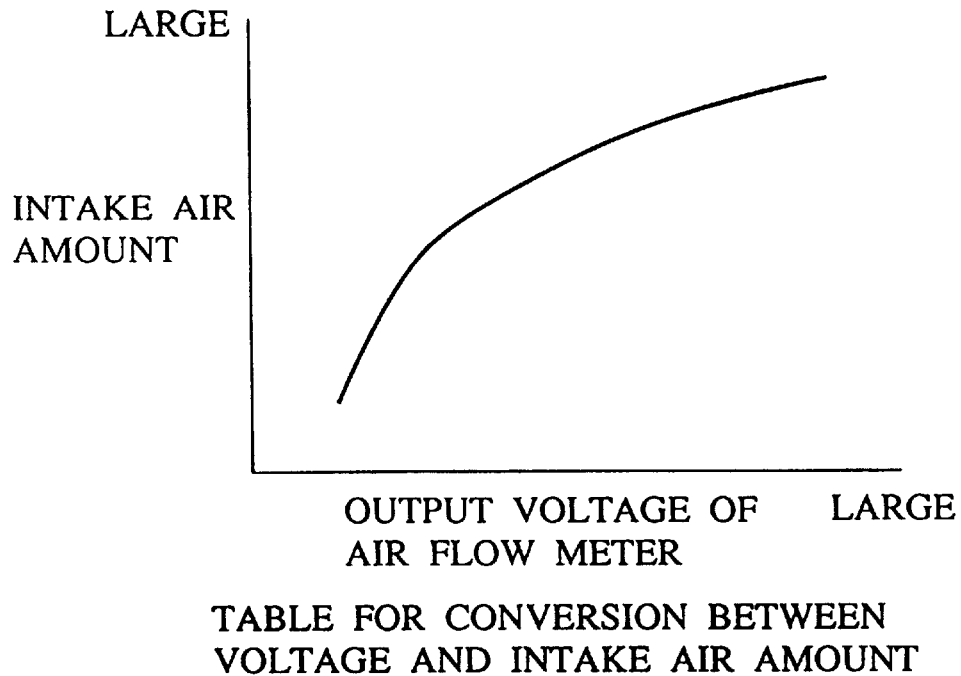
FIG. 12 is a graph showing a table for conversion between a voltage and an intake air volume.

In a step S111, an output voltage of detecting means for detecting the intake air amount of the air flow meter and the like is read in, in step S102, detecting means as shown in FIG. 12 is converted by using a characteristic table (a table for converting between voltage and intake air amount) and in step 103, Qas0 is determined by an averaging operation so that the operation is completed.

Figure 13:
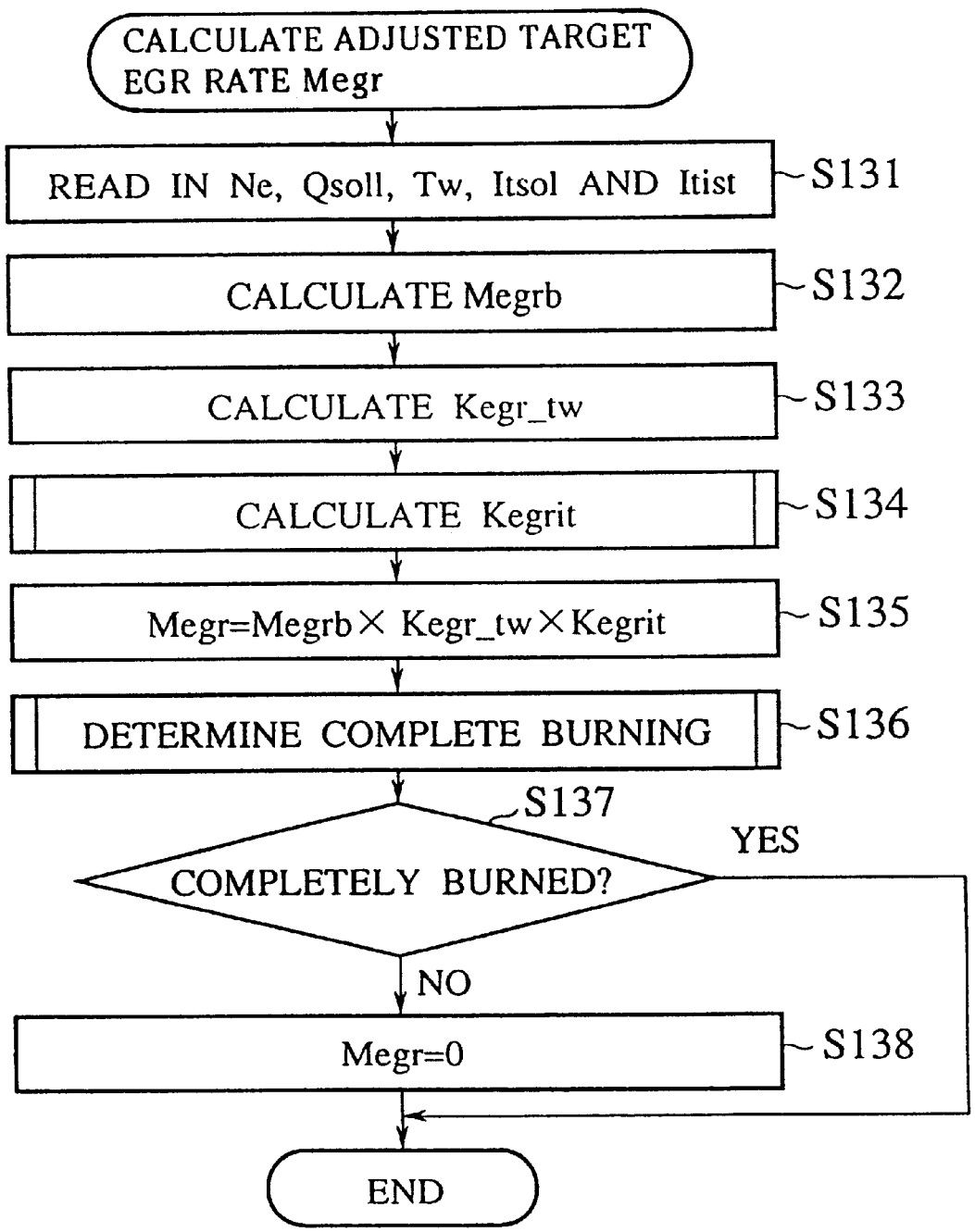
FIG. 13 is a flow chart showing procedures for calculating a adjusted target EGR rate.

FIG. 13 is a flow chart for calculating an adjusted target EGR rate Megr, which is calculated at each timing corresponding to the engine speed.

At first, in a step S131, the engine speed Ne, the volume for injecting fuel oil Qsoll, a engine coolant temperature Tw, a target injection timing Itsol and an actual injection timing Itist is read in. The actual injection timing Itist is obtained by detecting a starting time of lifting or an average between a starting time and an ending time by using an output of a sensor for sensing a needle valve lifting provided in a injection nozzle.

Figure 14:
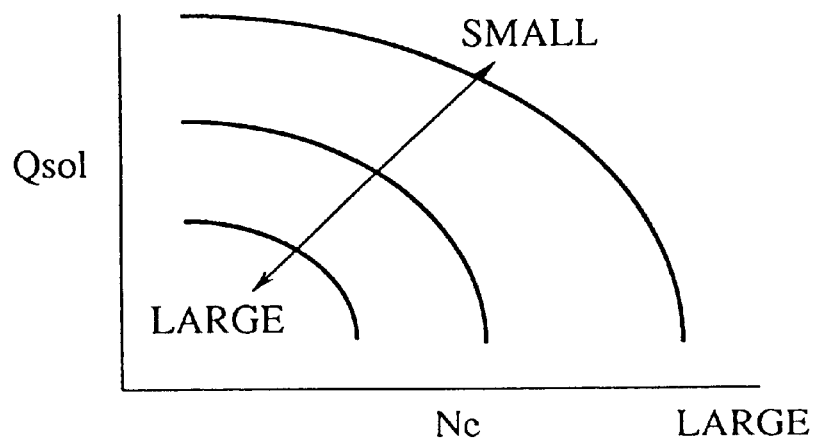
FIG. 14 is a graph showing an example of a map for a target EGR rate.

In a step S132, a map as shown in FIG. 14 is searched from the engine speed Ne and the volume for injecting fuel oil Qsoll and a standard target EGR rate Megrb is calculated.

Figure 15:
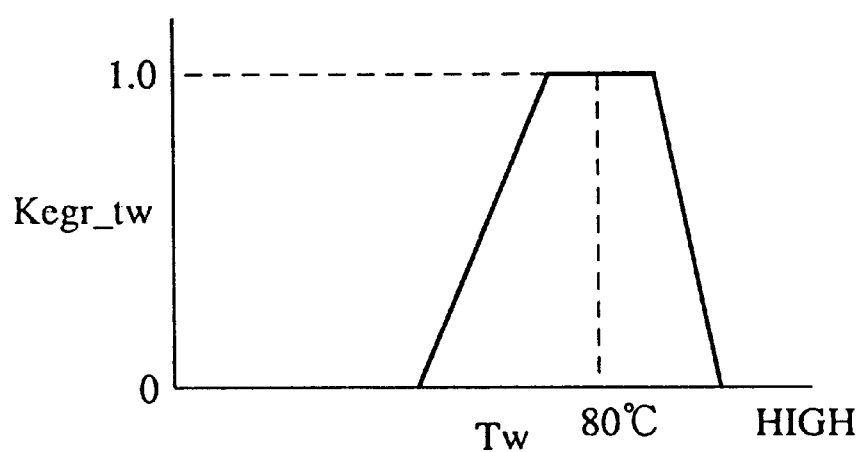
FIG. 15 is a graph showing an example of a table for adjustment coefficient between a target EGR rate and a water temperature.

In step S133, Kegr-tw is determined by searching a coefficient table for adjusting the target EGR rate from Tw with respect to the engine water temperature, for example, as shown in FIG. 15. In a step S134, an ignition timing error adjusting coefficient Kegrit is calculated. A calculating method will be explained hereinafter with reference to FIG. 17 and 18. An adjusted target EGR rate Megr is calculated by using an equation as shown in a step S135. Ina step S136, whether or not the engine is in a state of completely burned is determined. This method will be explain hereinafter by using FIG. 16. When in the step S136, a complete burning is determined, the operation is finished as it is, and when the complete burning is not determined, in a step S137, the adjust target EGR rate Megr is set to 0 and the operation is finished.

Figure 16:
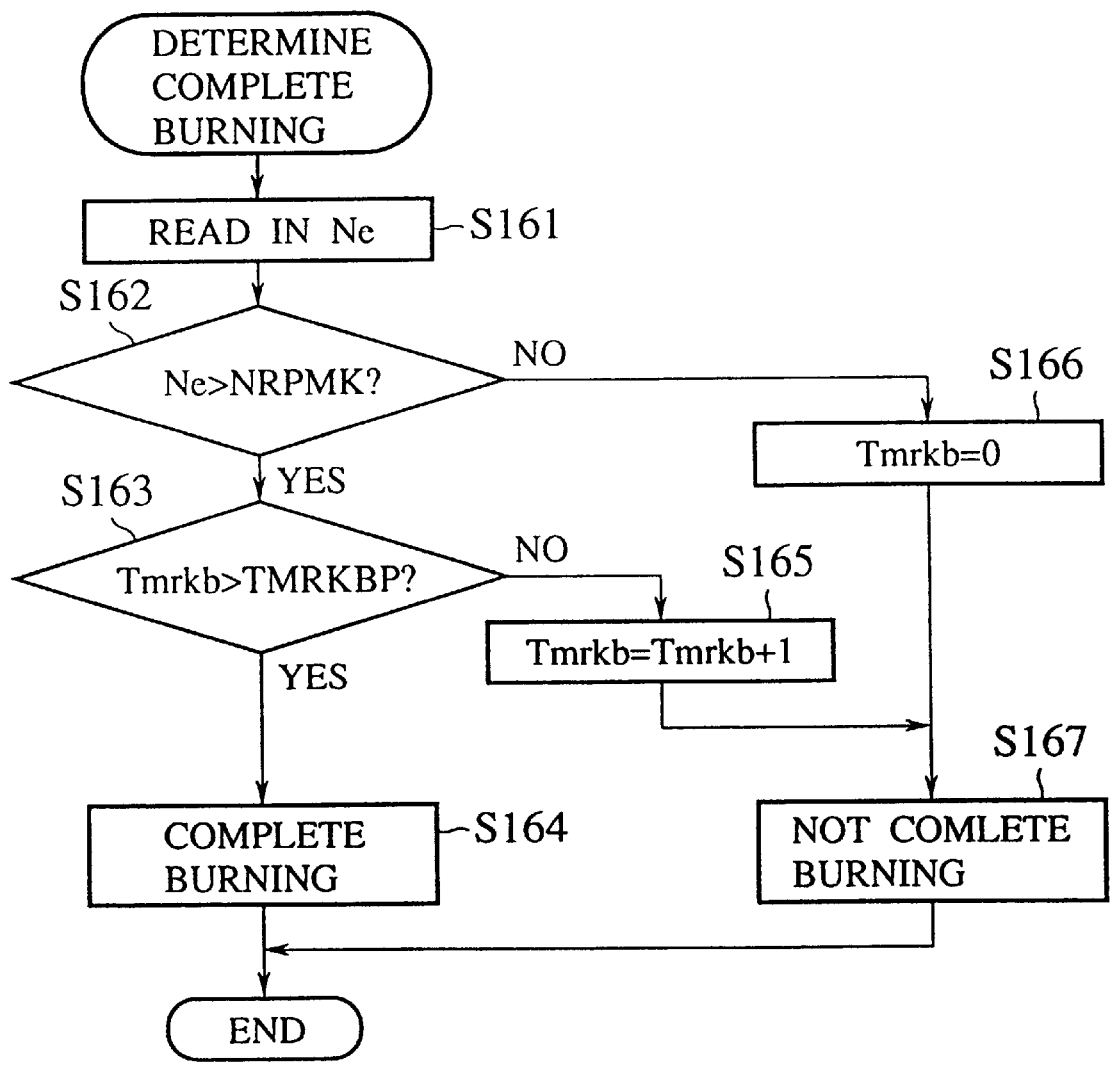
FIG. 16 is a flow chart showing procedures for determining whether or not the engine is completely burned.

FIG. 16 is a flow chart for determining a complete burning of the engine and the calculation is performed every 10 millisecond.

At first, in a step S161, the engine speed Ne is read in and in a step S162, the value is compared with a complete burning determination slice level NRPMK and when the value Ne is larger, the step is advanced to a step S163. In the step S163, the value is compared with a counter Tmrkb after determination of complete burning by revolution and a predetermined time period TMRKBP and when the value is larger, the step is advanced to a step S164 and the operation is finished as determining a complete burning. When the value Ne is smaller in the step S162, the step is advanced to a step S166, the value Tmrkb is cleared and the operation is finished as determining anot-complete burning. In the step S163, when the value Tmrkb is smaller, the step is advanced to a step S165, the value Tmrkb is increased to advance to a step S167 and the operation is finished as determining a not-complete burning.

In this operation, the determination in which a complete burning is determined when the engine speed becomes equal to or more than a predetermined value (for example, not less than 400 revolution per minute) and a predetermined time period has passed is performed.

Figure 17:
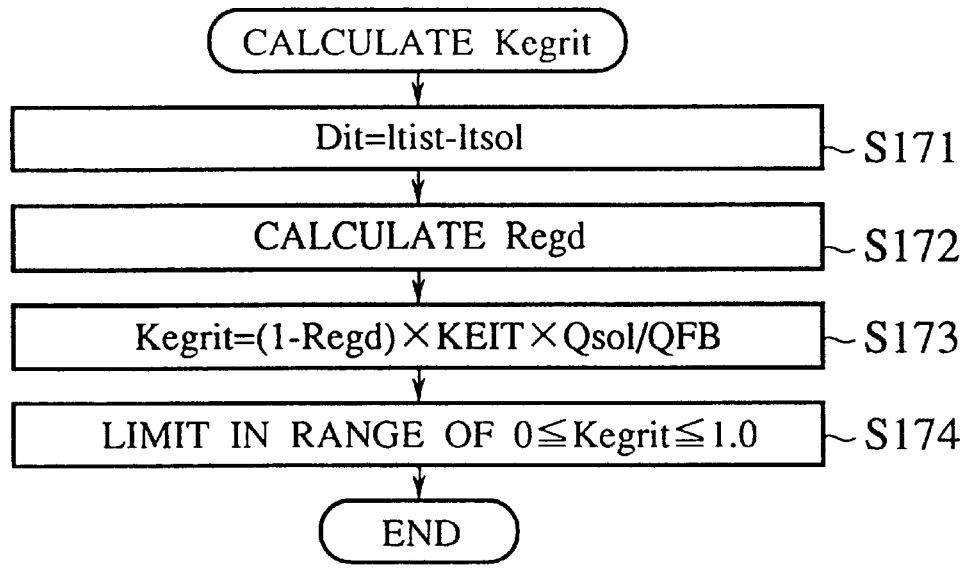
FIG. 17 is a flow chart showing procedures for calculating an injection timing error adjusting coefficient.

FIG. 17 is a flow chart for calculating a injection timing error adjusting coefficient Kegrit.

Figure 18:
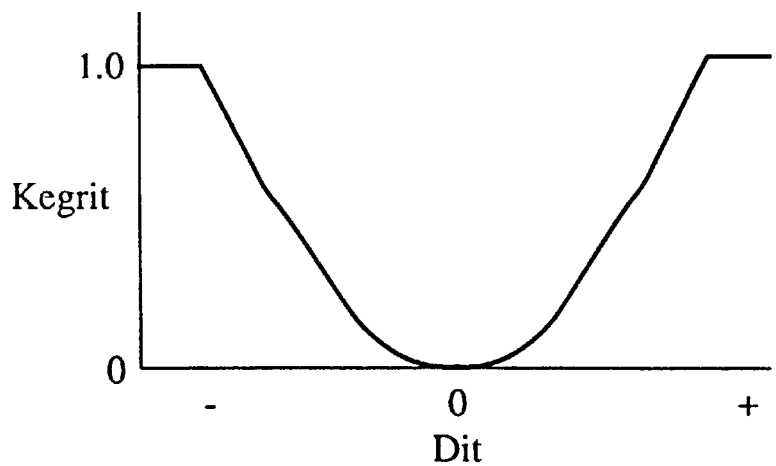
FIG. 18 is a graph showing an example of a table between an injection timing error and an adjustment rate.
Figure 19:
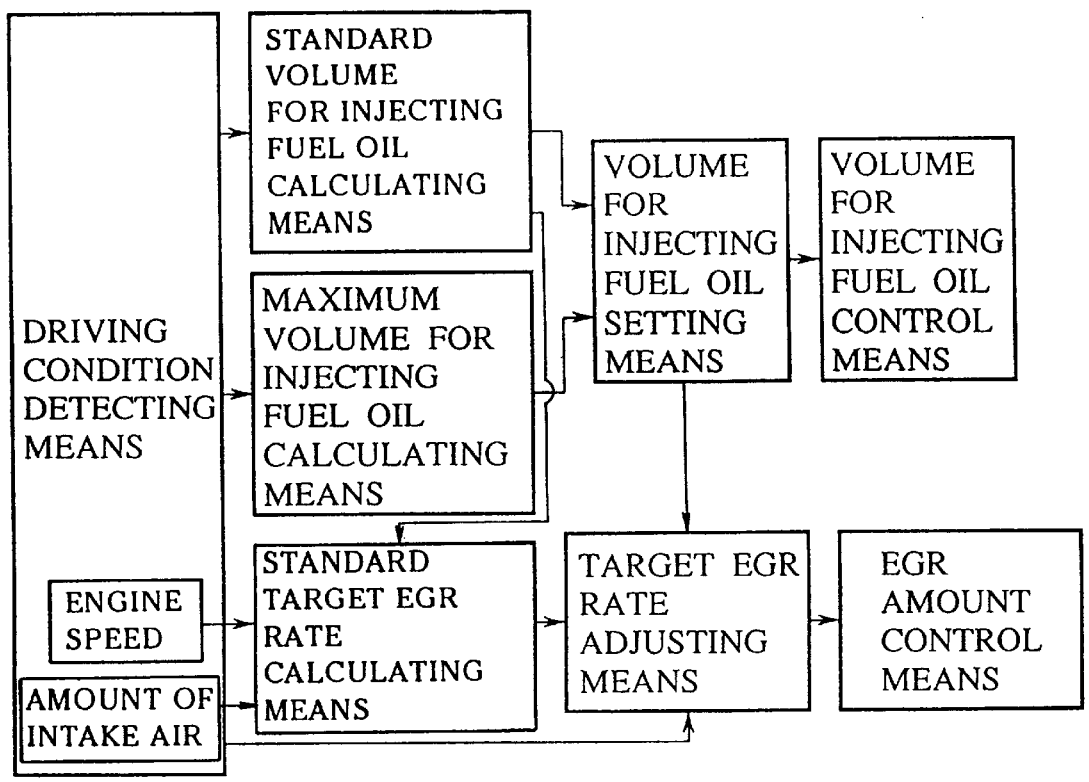
FIG. 19 is a standard block diagram of a control apparatus for an internal combustion engine in accordance with the present invention.

At first, in a step S171, a difference Dit between an actual injection timing Itist and a target injection timing Itsol is calculated. In a step S172, a adjustment rate Regd with respect to the injection timing error is set, for example, by searching from a table as shown in FIG. 18. In a step S173, the ignition timing error adjusting coefficient Kegrit is calculated from the value Regd and the volume for injecting fuel oil Qsoll by using a equation shown in the drawing. In a step S174, the operation is completed by limiting the value Kegrit to a range between 0 and 1. This limiting is for the purpose of not being over the standard target value even when the adjustment gain is increased by increasing the injection amount.

As explained above, since the adjustment sensitivity can be changed with respect to the load by changing the adjustment rate by the load such as the injection amount when the EGR is adjusted with respect to the difference between the target value and the actual value of the injection timing, the required EGR can be faithfully supplied in correspondence to the injection timing error value. Further, the present invention is effectively applied to a system having a high exhaust emission sensibility with respect to a range of required EGR amount, the EGR and the injection timing.

Next, an embodiment of a control apparatus for an internal combustion engine in accordance with the present invention will be explained.

Figure 20:
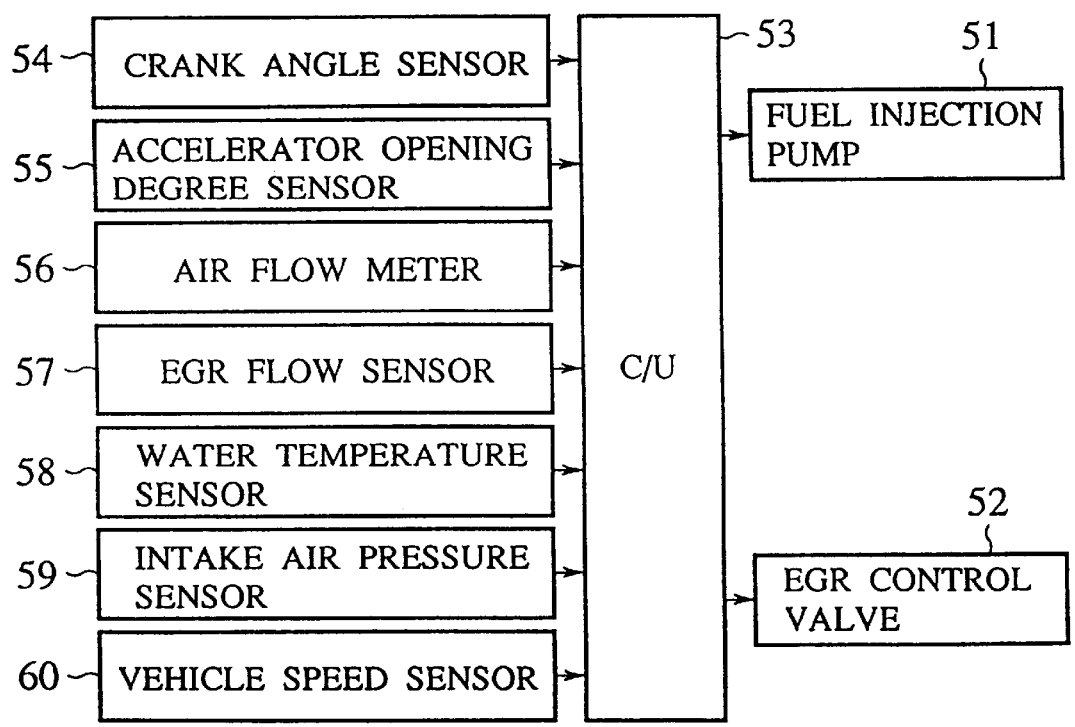
FIG. 20 is a systematic view in relation to the control apparatus of the present invention.

FIG. 20 is a system drawing in connection with the control apparatus for the internal combustion engine.

A fuel injection pump 51 is provided with a control sleeve (not shown) as a volume for injecting fuel oil control means inside thereof, and the control sleeve is driven through a motor and the like in response to a signal from a control unit 53 so that the volume for injecting fuel oil can be controlled.

An EGR control valve 52 is provided in an EGR passage communicating the exhaust system for the engine with the intake system, and is driven by a signal from the control unit 53 through an electromagnetic valve for controlling a negative pressure in the case of a negative pressure operating type or through a stepping motor in the case of a direct drive type, thereby serving as an EGR amount control means so as to control the EGR amount to a target EGR rate.

In the control unit 53, signals from various kinds of sensors as driving state detecting means are input. Concretely, the signals are input from a crank sensor 54, an accelerator opening degree sensor 55, an air flow meter 56, an EGR flow meter 57, a water temperature sensor 58, an intake air pressure sensor 59 and a vehicle speed sensor 60.

In this, the control unit 53 performs a calculating operation by a built-in micro computer in accordance with a below described flow chart and controls the fuel injection pump 51 and the EGR control valve 52.

Figure 21:
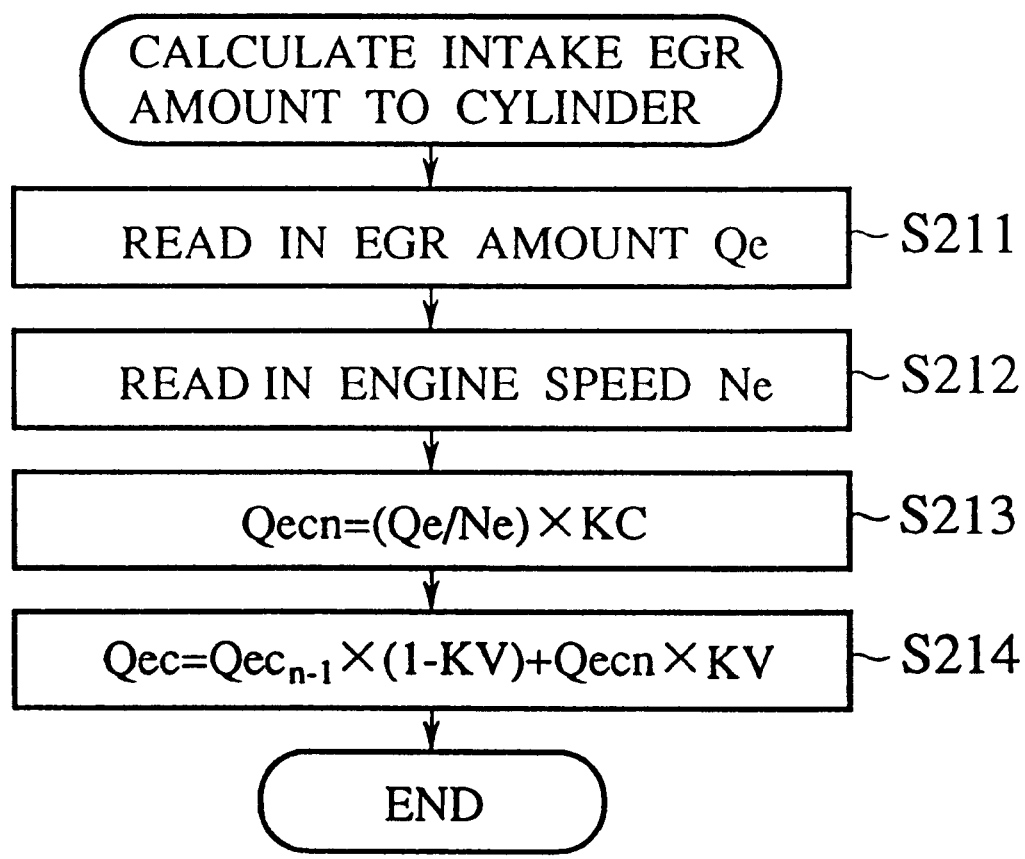
FIG. 21 is a flow chart showing procedures for calculating an intake EGR value sucked to the cylinder.

FIG. 21 is a flow chart for calculating an intake EGR amount to cylinder (an EGR amount sucked to the cylinder) and the calculation is performed at a corresponding timing to the engine revolution.

In a step S211, an EGR amount Qe detected on the basis of the signal from the EGR flow meter 57 is read in. The EGR amount Qe may be obtained by a suitable estimating means.

In a step S212, the engine speed Ne is read in.

In a step S213, the EGR amount Qe is converted into an EGR amount Qec per 1 intake stroke in accordance with the following equation.

$$Qecn=(Qe/Ne) \times KC$$

in which KC is a constant.

In a step S214, a delay operation corresponding to a dynamics in the collector is performed, thereby obtaining the intake EGR amount to cylinder Qec and the operation is completed.

$$Qec=Qec_{n-1} \times (1-KV) + Qecn \times KV$$

in which KV is a constant.

Figure 22:
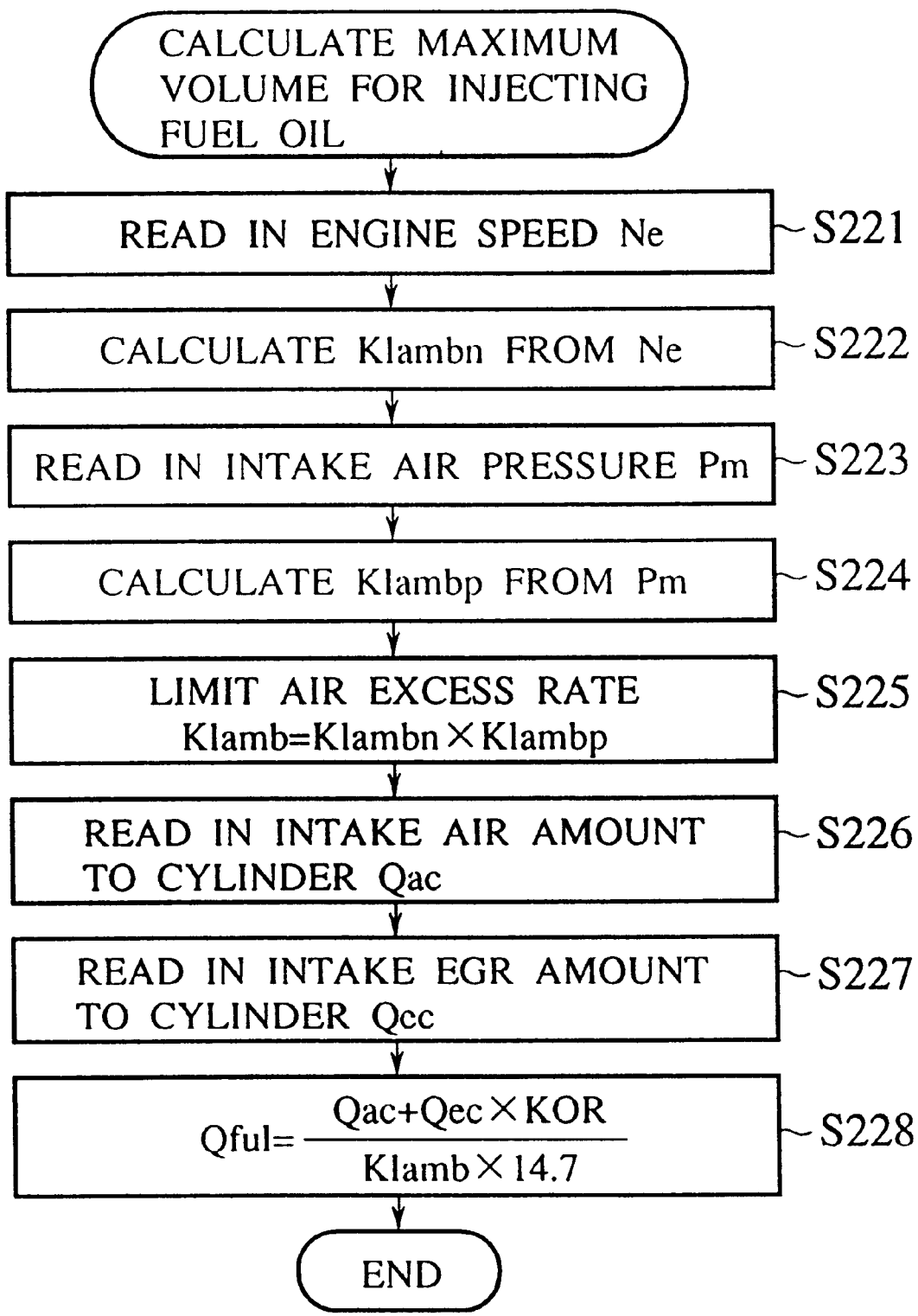
FIG. 22 is a flow chart showing procedures for calculating a maximum volume for injecting fuel oil.

FIG. 22 is a flow chart for calculating a maximum volume for injecting fuel oil and the calculation is performed at a timing corresponding to the engine revolution. The flow chart corresponds to maximum volume for injecting fuel oil calculating means.

In a step S221, the engine speed Ne is read in.

Figure 23:
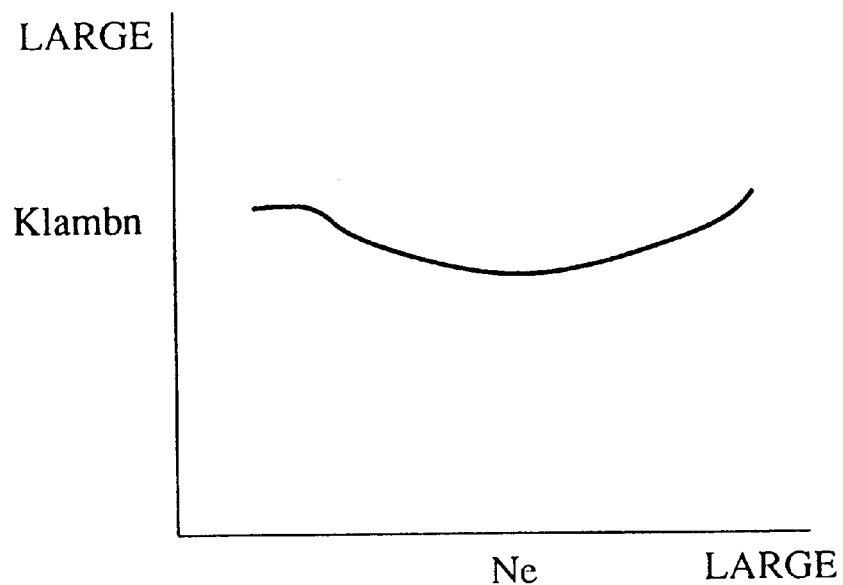
FIG. 23 is a graph showing a table for limit air excess rate in a non-oversupply.

In a step S222, a limit air excess rate (a rich limit) Klambn is set from the engine speed Ne with reference to a table for the limit air excess rate in a no super charging state as shown in FIG. 23.

In a step S223, an intake air pressure Pm detected on the basis of the signal from the intake air pressure sensor 59 is read in.

Figure 24:
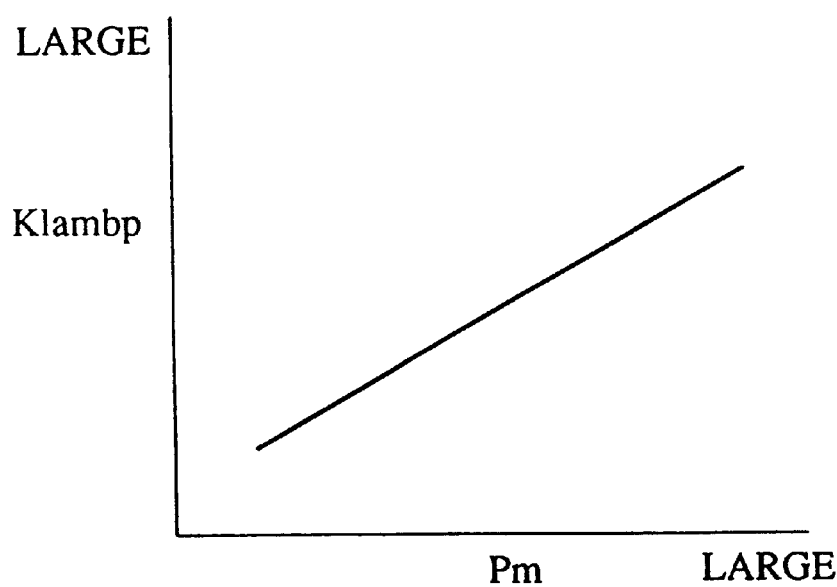
FIG. 24 is a graph showing a table for a relation between the limit air excess rate and a pressure adjusting value.

In a step S224, a limit air excess rate pressure adjusting value Klambp is set from the intake air pressure Pm with reference to a table for the limit air excess rate pressure adjusting value as shown in FIG. 24.

In a step S225, the limit air excess rate Klambn is adjusted by the pressure adjusting value Klambp thereof in accordance with the following equation so that a final limit air excess rate Klamb is calculated.

$$Klamb = Klambn \times Klambp$$

In this case, the table in FIG. 24 is on the basis of a characteristic that the limit air excess rate (rich limit) becomes worse because the air utilization rate is reduced by that a complete penetration force of the fuel spray is relatively reduced when the air density becomes high together with increasing the intake air pressure Pm.

In a step S226, the intake air amount to cylinder Qac in accordance with the flow chart in FIG. 10 is read in.

In a step S227, the intake EGR amount to cylinder Qec in accordance with the flow chart in FIG. 21 is read in.

In a step S228, a maximum volume for injecting fuel oil Qful is calculated on the basis of the intake air amount Qac, the intake EGR amount to cylinder Qec and the limit air excess rate Klamb by using the following equation and the operation is completed.

$$Qful = (Qac + Qec \times KOR)/(Klamb \times 14.7)$$

in which KOR is a constant.

Figure 25:
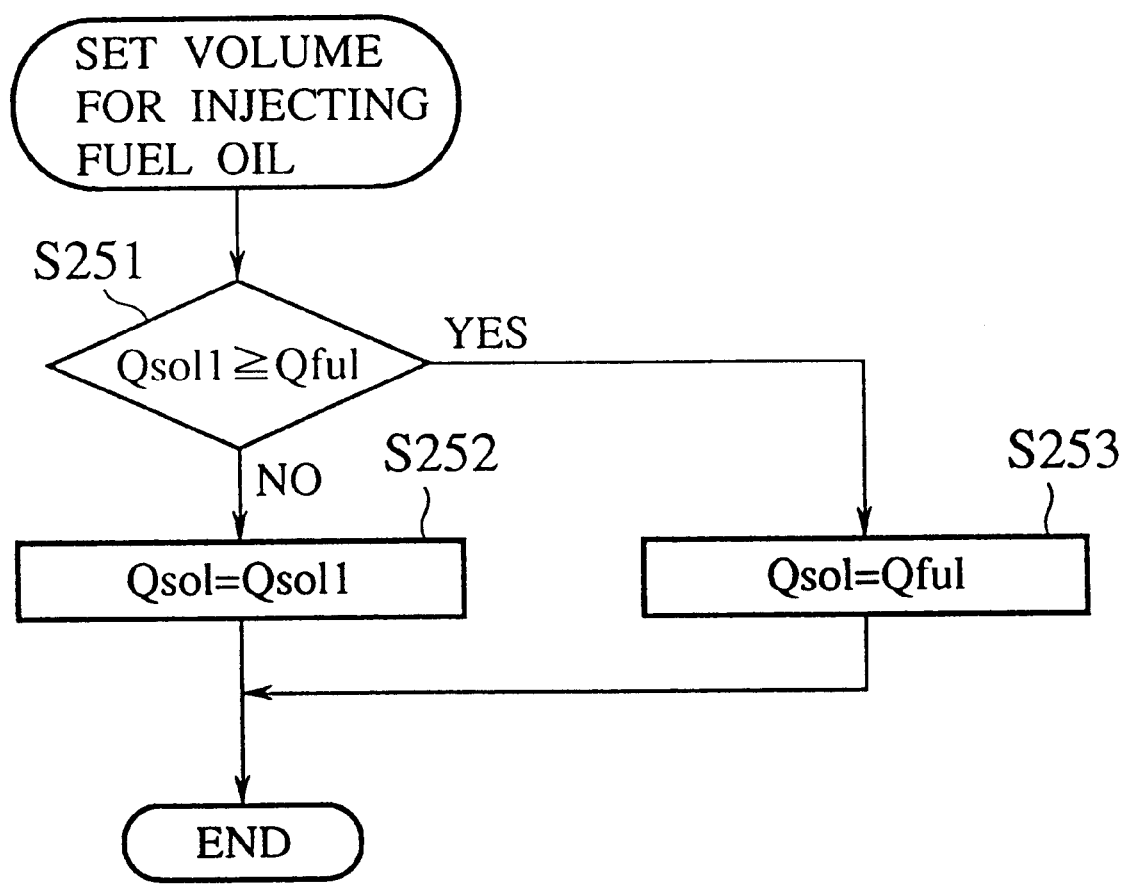
FIG. 25 is a flow chart showing procedures for setting a volume for injecting fuel oil.

FIG. 25 is a flow chart for setting the volume for injecting fuel oil and the setting is performed at a timing corresponding to the engine revolution. This flow chart corresponds to the volume for injecting fuel oil setting means.

In a step S251, the standard volume for injecting fuel oil Qsoll in accordance with the flow chart in FIG. 12 and the maximum volume for injecting fuel oil Qful in accordance with the flow chart in FIG. 22 are read in and these values are compared with each other.

As a result of comparison, when Qsoll<Qful, the step is advanced to a step S252, the Qsoll is selected, the volume for injecting fuel oil Qsol=Qsoll is set and the operation is completed.

Inversely, when Qsoll≧Qful, the step is advance to a step S253, the Qful is selected, the volume for injecting fuel oil Qsol=Qful is set and the operation is completed.

As described above, a smaller one is set to a final volume for injecting fuel oil Qsol by comparing the standard volume for injecting fuel oil Qsoll with the maximum volume for injecting fuel oil Qful. The volume for injecting fuel oil to the engine is controlled by the fuel injection pump in accordance with the final volume for injecting fuel oil Qsol.

Figure 26:
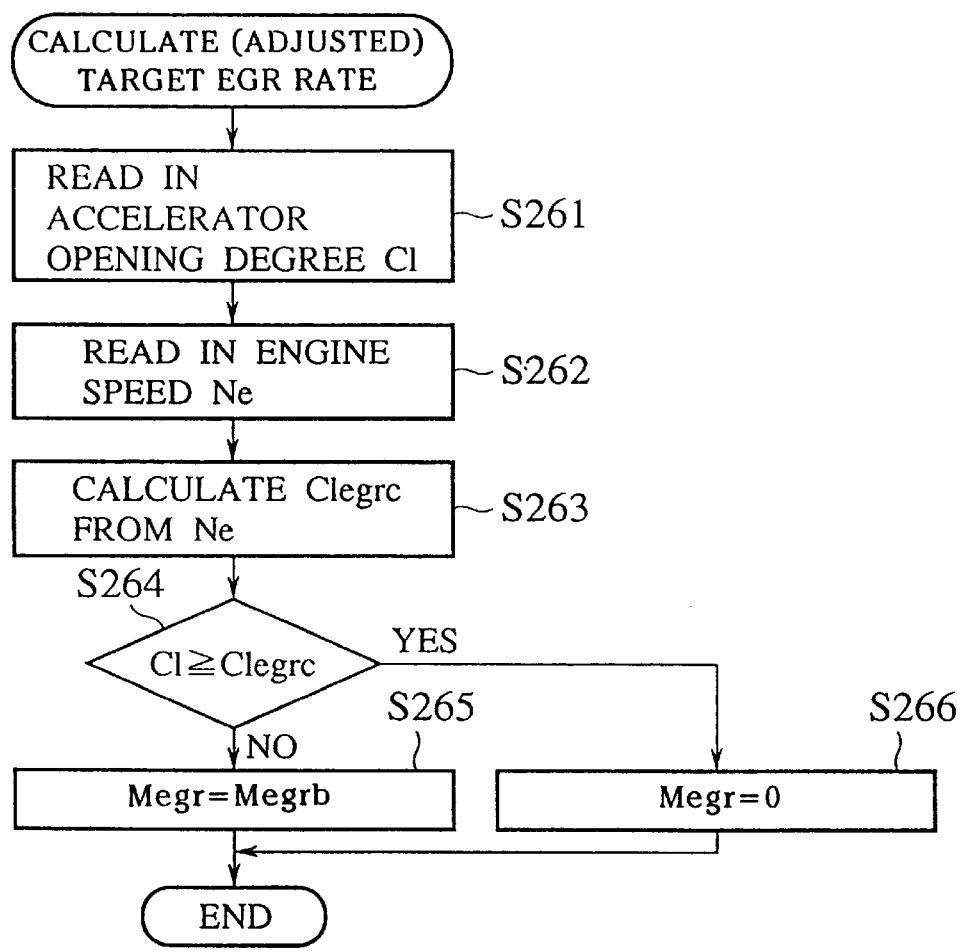
FIG. 26 is a flow chart showing procedures for calculating (adjusting) a target EGR rate.

FIG. 26 is a flow chart for calculating (adjusting) the target EGR rate and the calculation is performed at a timing corresponding to the engine revolution. The flow chart corresponds to the target EGR rate adjusting means.

In a step S261, an opening degree Cl of the accelerator is read in.

In a step S262, the engine speed Ne is read in.

Figure 27:
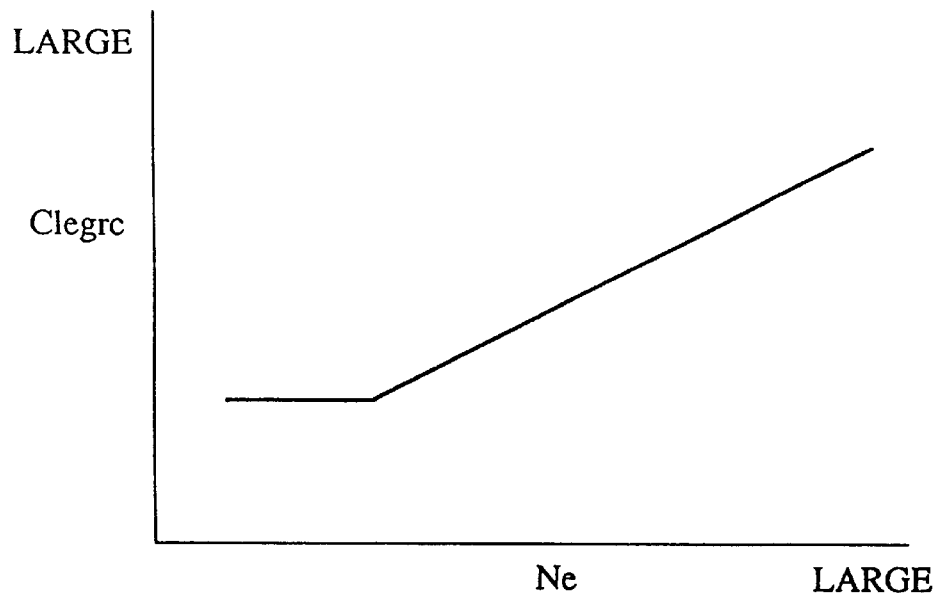
FIG. 27 is a graph showing a table for a setting value of an accelerator opening degree.

In a step S263, an accelerator opening degree setting value Clegrc is determined from the engine speed Ne with reference to a table for the accelerator opening degree setting value as shown in FIG. 27. In this, the Clegrc is set smaller the lower the engine revolution is.

In a step S264, the accelerator opening degree Cl is compared with the setting value thereof Clegrc.

As a result of comparison, when Cl<Clegrc, in a step S265, the adjust target EGR rate Megr=Megrb is set and the operation is completed.

Inversely, when Cl≧Clegrc, in a step S266, the adjusted target EGR rate Megr=0 is set and the operation is completed.

When the adjusted target EGR rate Megr is set in the above manner, the EGR amount is controlled by the EGR valve so as to obtain the adjusted target EGR rate Megr. In this control, when the accelerator opening degree Cl is equal or more than the setting value Clegrc, the adjusted target EGR rate Megr is adjusted to 0 and the EGR is stopped.

Next, another embodiment of the present invention is explained.

Figure 28:
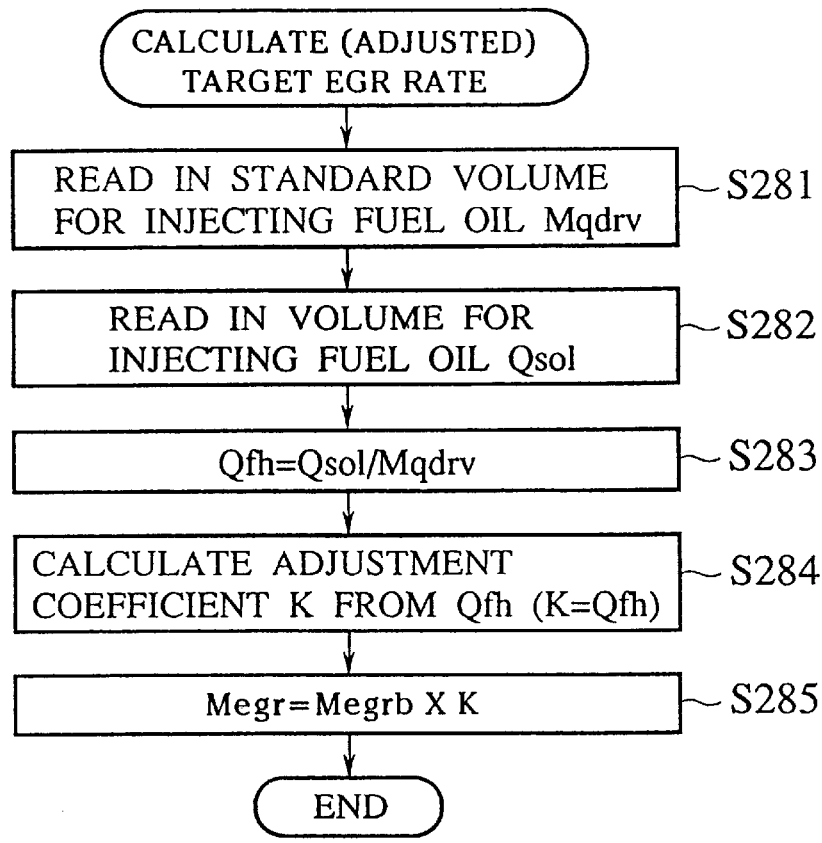
FIG. 28 is a flow chart showing a second example of procedures for calculating (adjusting) a target EGR rate.

FIG. 28 shows a second example of a flow chart for calculating (adjusting) a target EGR rate and is performed in place of the flow chart in FIG. 26.

In a step S281, a standard volume for injecting fuel oil Mqdrv which is determined by the engine speed Ne and the accelerator opening degree Cl in the flow chart in FIG. 2 is read in.

In a step S282, a final volume for injecting fuel oil Qsol in accordance with the flow chart in FIG. 25 is read in.

In a step S283, a adjusting rate Qfh for the volume for injecting fuel oil is calculated as a ratio between the standard volume for injecting fuel oil Mqdrv and the final volume for injecting fuel oil Qsol.

$$Qfh = Qsol/Mqdrv$$

Figure 29:
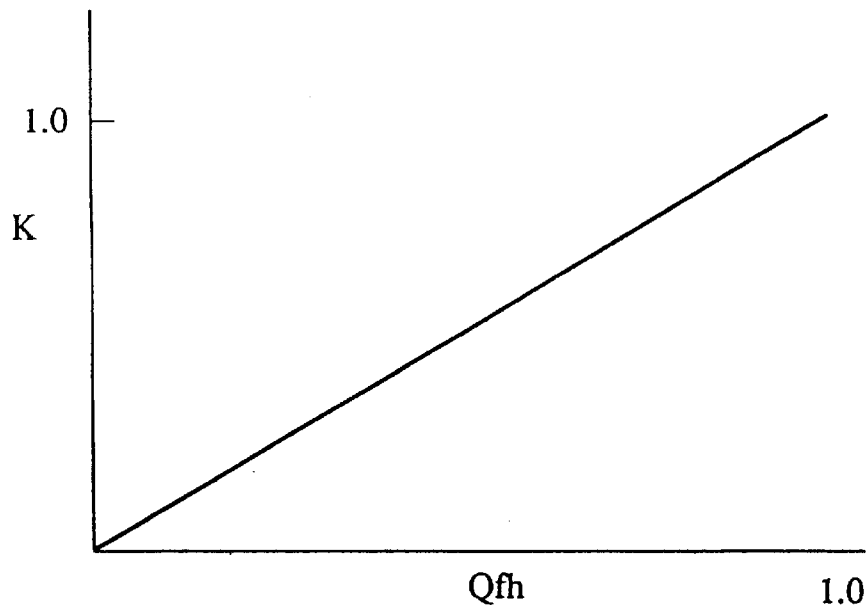
FIG. 29 is a graph showing a table for an adjustment coefficient.

In a step S284, a adjustment coefficient K is set from the adjusting rate Qfh for the volume for injecting fuel oil with reference to a table for the adjustment coefficient as shown in FIG. 29. In this case, it is assumed that the adjustment coefficient K=the adjusting rate for the volume for injecting fuel oil Qfh.

In a step S285, a adjusted target EGR rate Megr is calculated by multiplying the adjustment coefficient K (=the adjusting rate for the volume for injecting fuel oil Qfh) to the standard target EGR rate Megrb in accordance with the flow chart in FIG. 13, as shown in the following equation.

$$Megr=Megr \times K$$

As mentioned above, the adjusted target EGR rate Megr is adjusted to be reduced in correspondence to the adjusting rate for the volume for injecting fuel oil Qfh, that is, in correspondence to the degree of limiting the volume for injecting fuel oil.

When the adjusted target EGR rate Megr is set, the EGR amount is controlled by the EGR valve so as to obtain the adjusted target EGR rate Megr.

Figure 30:
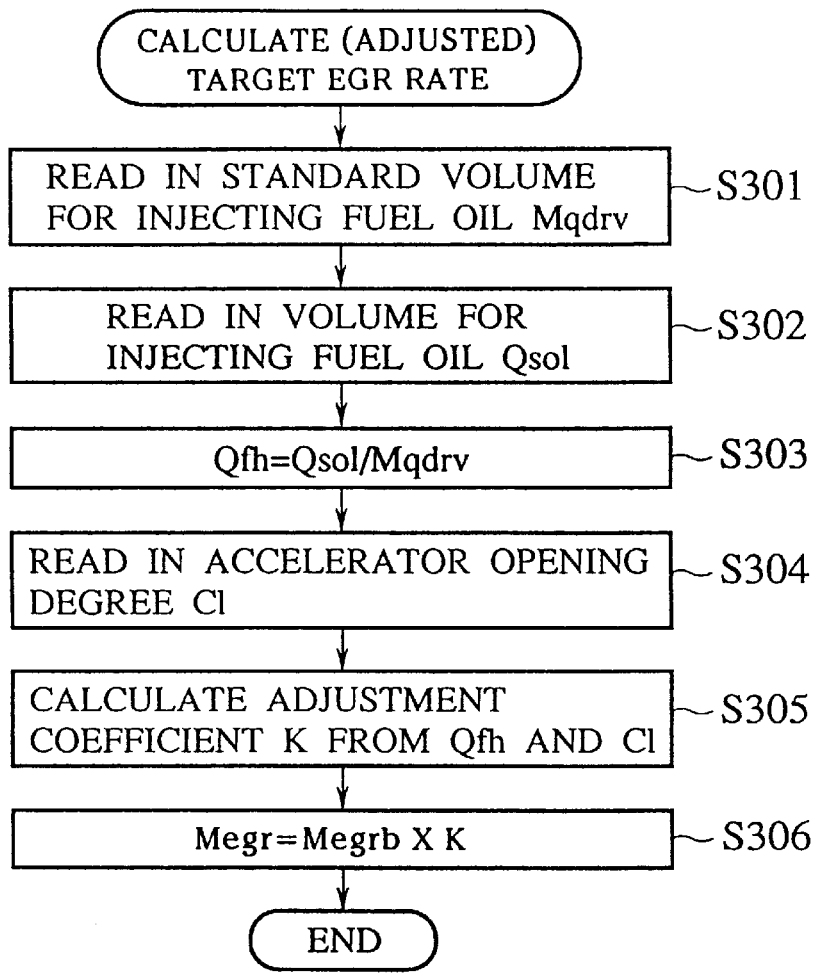
FIG. 30 is a flow chart showing a third example of procedures for calculating (adjusting) a target EGR rate.

FIG. 30 shows a third example of a flow chart for calculating (adjusting) a target EGR rate and is performed in place of the flow chart in FIG. 26.

Steps S301 to S303 are the same as the steps S281 to S283, which calculate the adjusting rate for the volume for injecting fuel oil Qfh=Qsol/Mqdrv as a ratio between the standard volume for injecting fuel oil Mqdrv and the final volume for injecting fuel oil Qsol.

In a step S304, the accelerator opening degree Cl is read in.

Figure 31:
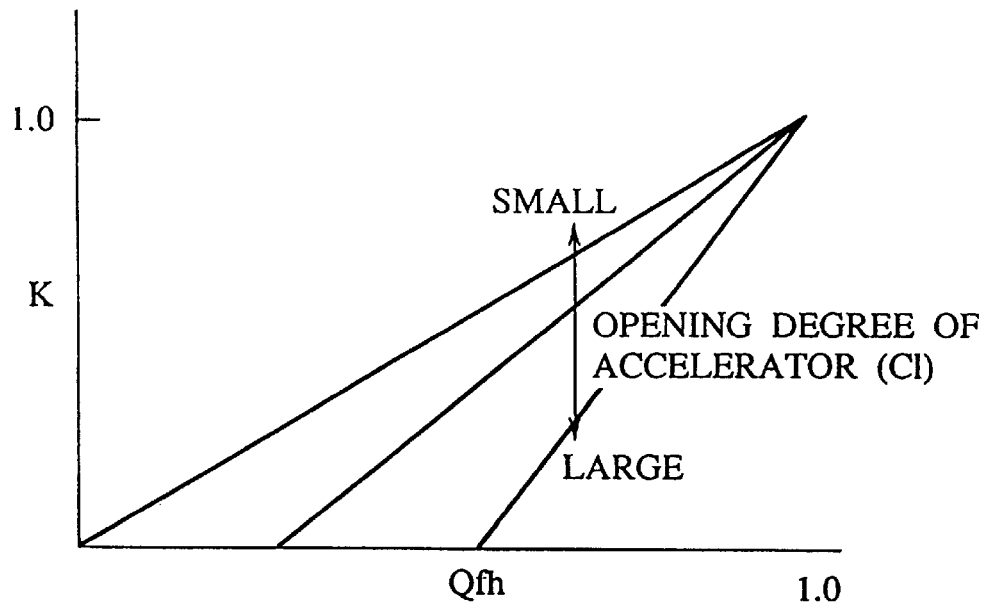
FIG. 31 is a graph showing a map for an adjustment coefficient.

In a step S305, the adjustment coefficient K is set from the adjusting rate Qfh for the volume for injecting fuel oil and the accelerator opening degree Cl with reference to a map for the adjustment coefficient as shown in FIG. 31.

In this case, the adjustment coefficient K is set smaller so as to adjust to reduce the target EGR rate together with increasing the accelerator opening degree Cl.

In a step S306, a adjusted target EGR rate Megr=Megrb×K is calculated by multiplying the adjustment coefficient K to the standard target EGR rate Megrb.

Figure 32:
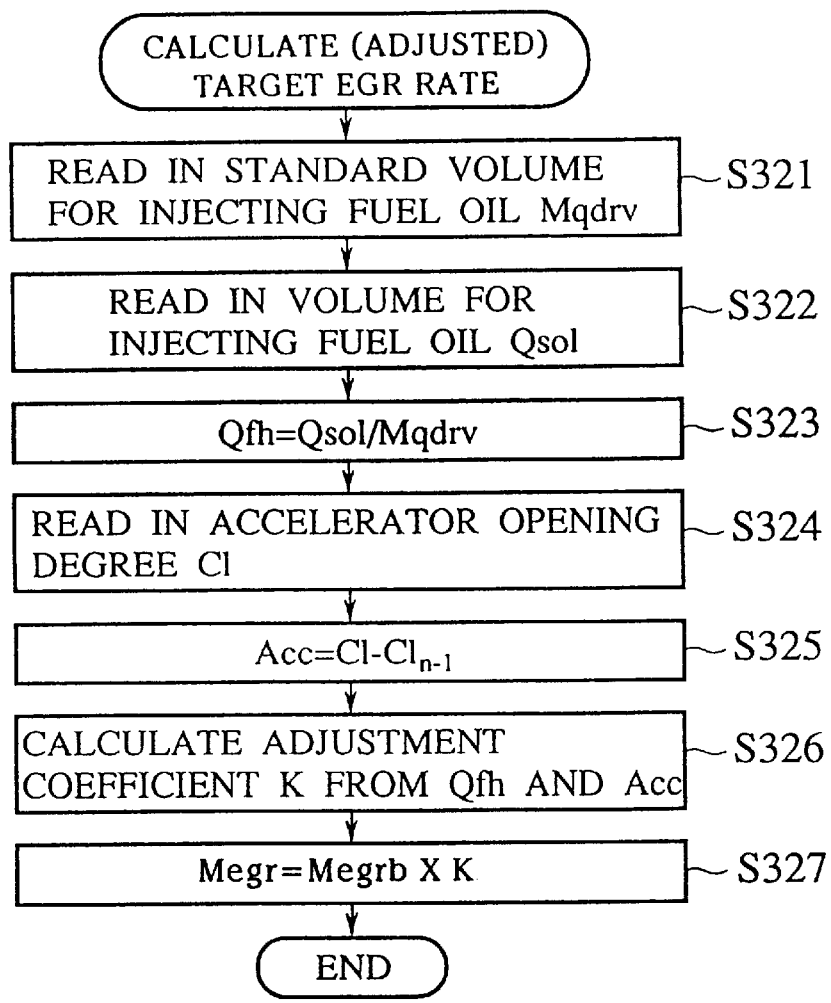
FIG. 32 is a flow chart showing a fourth example of procedures for calculating (adjusting) a target EGR rate.

FIG. 32 shows a fourth example of a flow chart for calculating (adjusting) a target EGR rate and is performed in place of the flow chart in FIG. 26.

Steps S321 to S323 are the same as the steps S281 to S283, which calculate the adjusting rate for the volume for injecting fuel oil Qfh=Qsol/Mqdrv as a ratio between the standard volume for injecting fuel oil Mqdrv and the final volume for injecting fuel oil Qsol.

In a step S324, the accelerator opening degree Cl is read in.

In a step S325, the acceleration Acc is calculated as a changing value of the accelerator opening degree by subtracting the accelerator opening degree L times before from the now accelerator opening degree in accordance with the following equation.

$$Acc=Cl-Cl_{n-L}$$

in which L is a constant.

Figure 33:
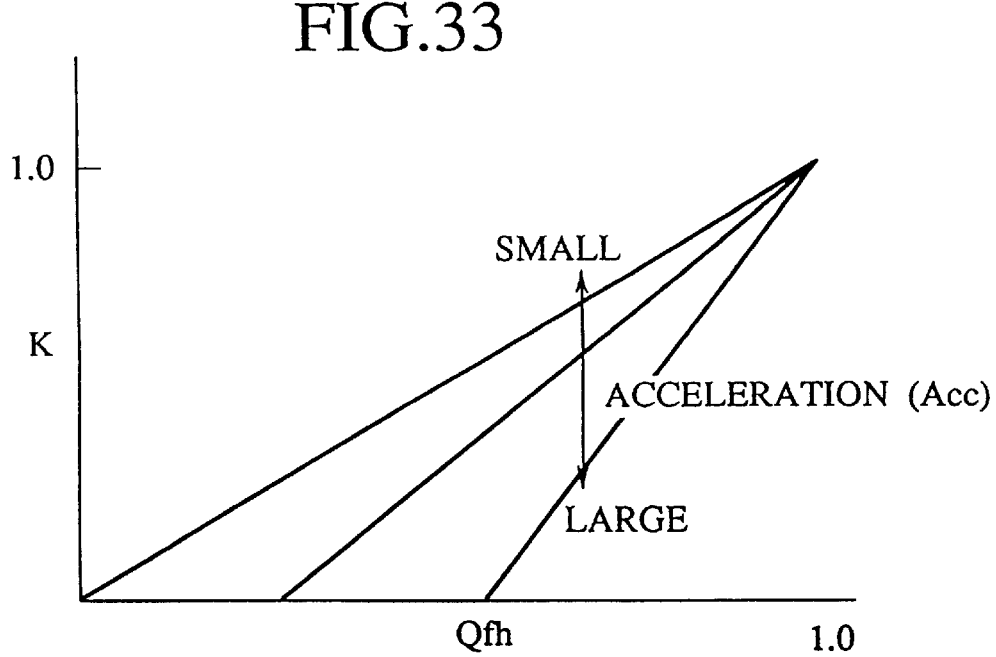
FIG. 33 is a graph showing a map for an adjustment coefficient.

In a step S326, the adjustment coefficient K is set from the adjusting rate for the volume for injecting fuel oil Qfh and the acceleration Acc with reference to a map for the adjustment coefficient as shown in FIG. 33.

In this case, the adjustment coefficient K is set smaller so as to adjust to reduce the target EGR rate together with increasing the acceleration Acc.

In a step S327, a adjusted target EGR rate Megr=Megrb×K is calculated by multiplying the adjustment coefficient K to the standard target EGR rate Megrb.

Figure 34:
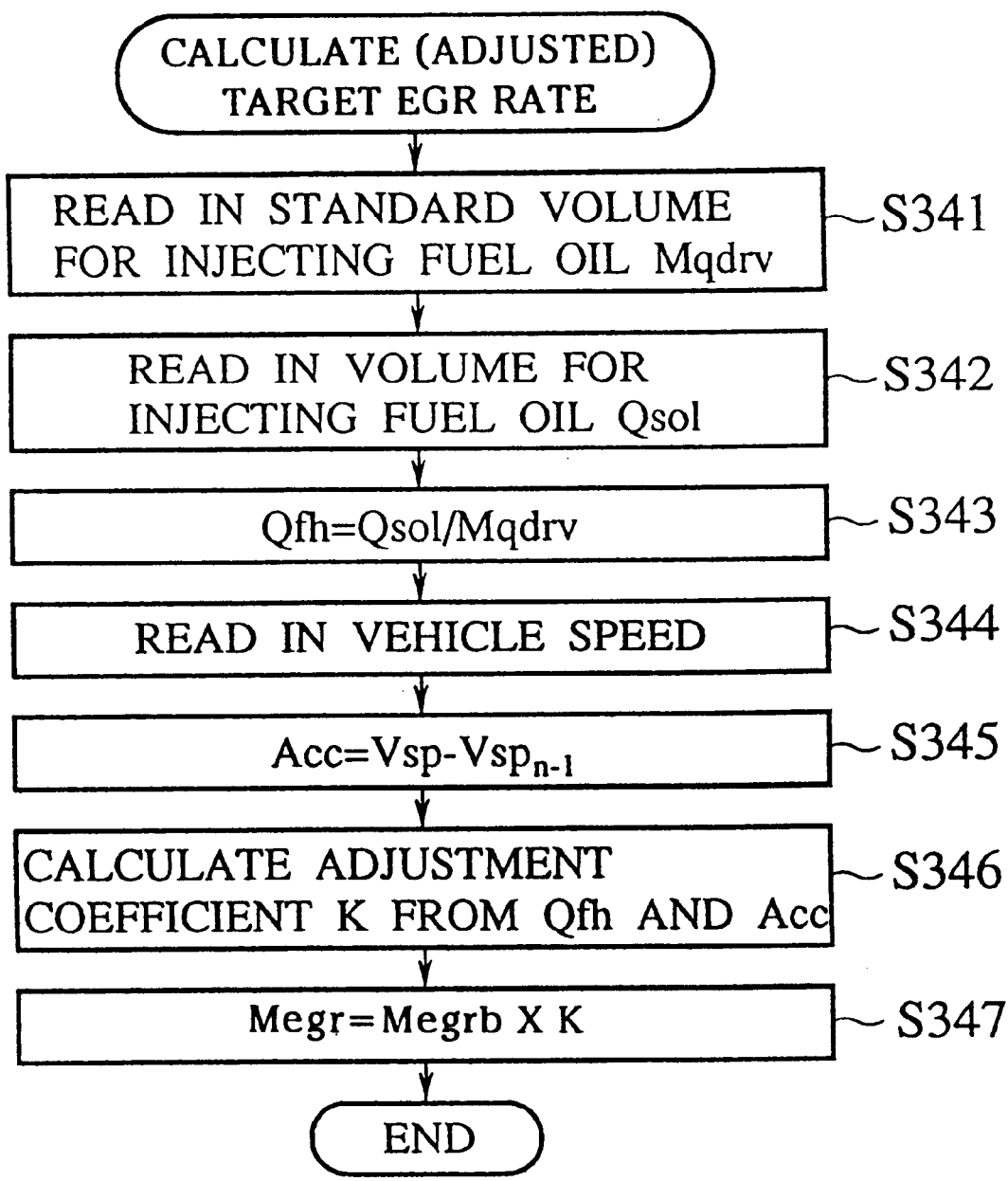
FIG. 34 is a flow chart showing a fifth example of procedures for calculating (adjusting) a target EGR rate.
Figure 35:
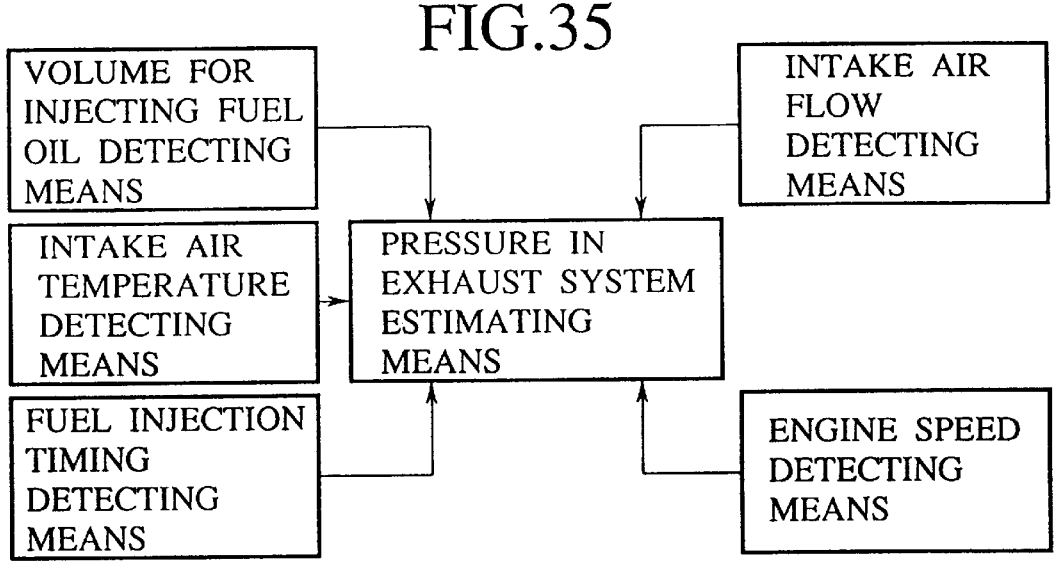
FIG. 35 is a standard block diagram of an estimation apparatus in an exhaust system for an internal combustion engine in accordance with the present invention.
Figure 36:
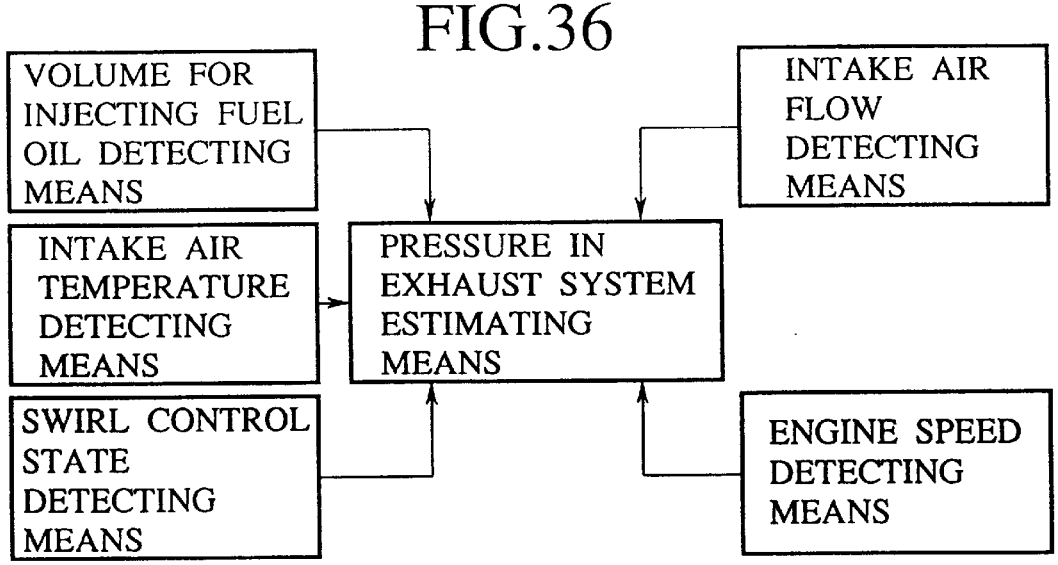
FIG. 36 is a standard block diagram of an estimation apparatus for estimating a pressure in an exhaust system for an internal combustion engine in accordance with the present invention.
Figure 37:
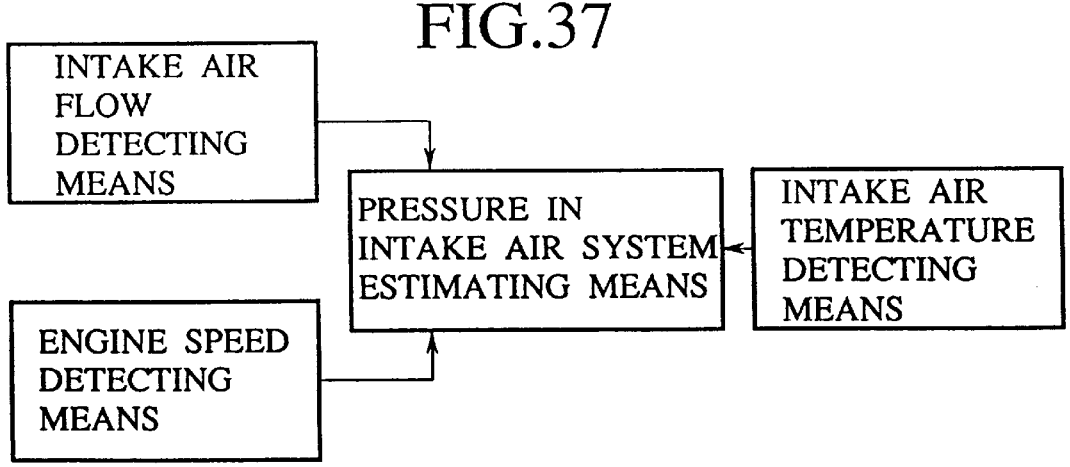
FIG. 37 is a standard block diagram of an estimation apparatus for estimating a pressure in an intake system for an internal combustion engine in accordance with the present invention.

FIG. 34 shows a fifth example of a flow chart for calculating (adjusting) a target EGR rate and is performed in place of the flow chart in FIG. 26.

This flow chart substantially corresponds to the flow chart shown in FIG. 32 and only steps S344 and S345 for detecting the acceleration Acc are different.

In a step S344, a vehicle speed Vsp which is detected on the basis of a signal from the vehicle speed sensor is read in.

In a step S345, the acceleration Acc is calculated as a changing value of the vehicle speed by subtracting the vehicle speed L times before from the now vehicle speed in accordance with the following equation.

$$Acc=Vsp-VSP_{n-L}$$

in which L is a constant.

Accordingly, in the case of detecting the acceleration by the changing value of the vehicle speed, the same effect can also be obtained.

Next, an embodiment of an estimation apparatus for estimating pressure in intake and exhaust systems for an internal combustion engine in accordance with the present invention will be explained.

Figure 38:
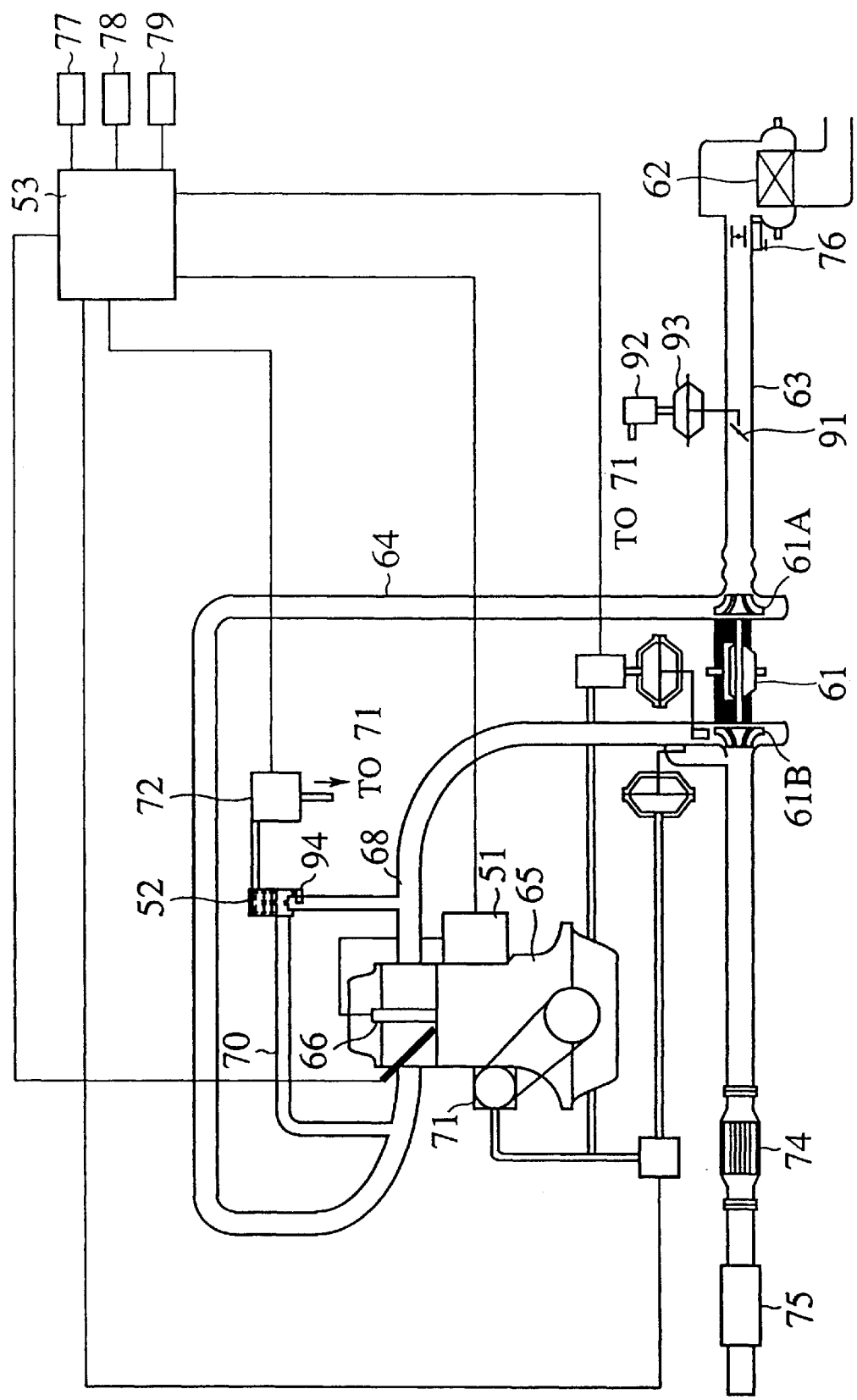
FIG. 38 is a drawing showing a total structure of an estimation apparatus for estimating pressures in intake and exhaust systems for an internal combustion engine in accordance with the present invention.

In FIG. 38 which shows a main structure of the apparatus in accordance with the present invention, a supercharger 61 pressurizes and supercharges air, which is removed dusts in an air filter 62 and sucked into an intake passage 63, by an intake air compressor 61A and thereafter feeds the air to an intake manifold 64 disposed in a downward side.

While to a fuel injection nozzle 66 mounted to a combustion chamber in an engine (a diesel engine) 65, fuel oil is supplied in a pressurized state and in a divided condition to each cylinder from a fuel injection pump 51. The fuel oil is injected from the fuel injection nozzle 66 toward the combustion chamber and the injected fuel oil is ignited at a final timing of a pressurized stroke and burned.

Further, an EGR passage 70 having an EGR control valve 52 is connected so as to connect an exhaust manifold 68 with the intake manifold 64 and a throttle valve 91 is arranged in an upward side of an intake air compressor 61A in the intake passage 63 so as to enlarge a differential pressure between an exhaust pressure and an intake pressure by throttling the intake air at the time of an EGR control and so as to easily perform an EGR. Accordingly, the EGR control is performed in such a manner as to throttle the throttle valve 91 for the purpose of improvement of exhaust air and reduction of noise mainly at a time of idling or low load and at the same time to control the opening degree of the EGR control valve 52. Concretely speaking, at the same time that the throttle valve 91 is throttled by introducing a negative pressure from a vacuum pump 71 to a diaphragm device 93 through an electromagnetic valve 92, an electromagnetic valve 72 which is duty controlled the negative pressure controls a dilution ratio to an atmosphere so that a pressure introduced to a pressure chamber in the EGR control valve 52 is controlled, thereby controlling an EGR rate due to control of the opening degree. The control for these EGR rate and fuel injection is performed by a control unit 53.

The EGR control valve 52 is provided with a lift sensor 94 for detecting a lift amount of a valve body.

After an exhaust turbine 61B of the super charger 61 is rotated by the exhaust manifold 68, particulate (exhaust fine particles) contained in an exhaust air after combustion are collected to a filter 74. Then the exhaust air is discharged to the atmosphere through a muffler 75 in which noise is arrested.

In the intake passage 63 disposed in an upward of the intake compressor 61A in the super charger 61, an air flow meter 76 for detecting an intake air flow is provided and further a speed sensor 77 for detecting the engine speed Ne, a lever opening degree sensor 78 for detecting an opening degree of a control lever (accelerator opening degree) in the fuel injection pump 51, a water temperature sensor 79 for detecting a water temperature and the like are provided. An allowable maximum injection amount of fuel oil corresponding to the intake air amount to cylinder is set by detecting a pressure in the intake system and a pressure in the exhaust system on the basis of the above detected values in a manner mentioned below.

Various kinds of operations by the control unit 53 are explained below.

The flow chart for calculating the intake air flow Qas0 is shown in FIG. 10. Further, the flow chart for calculating the intake air amount per an intake stroke sucked to the cylinder is shown in FIG. 11.

Figure 39:
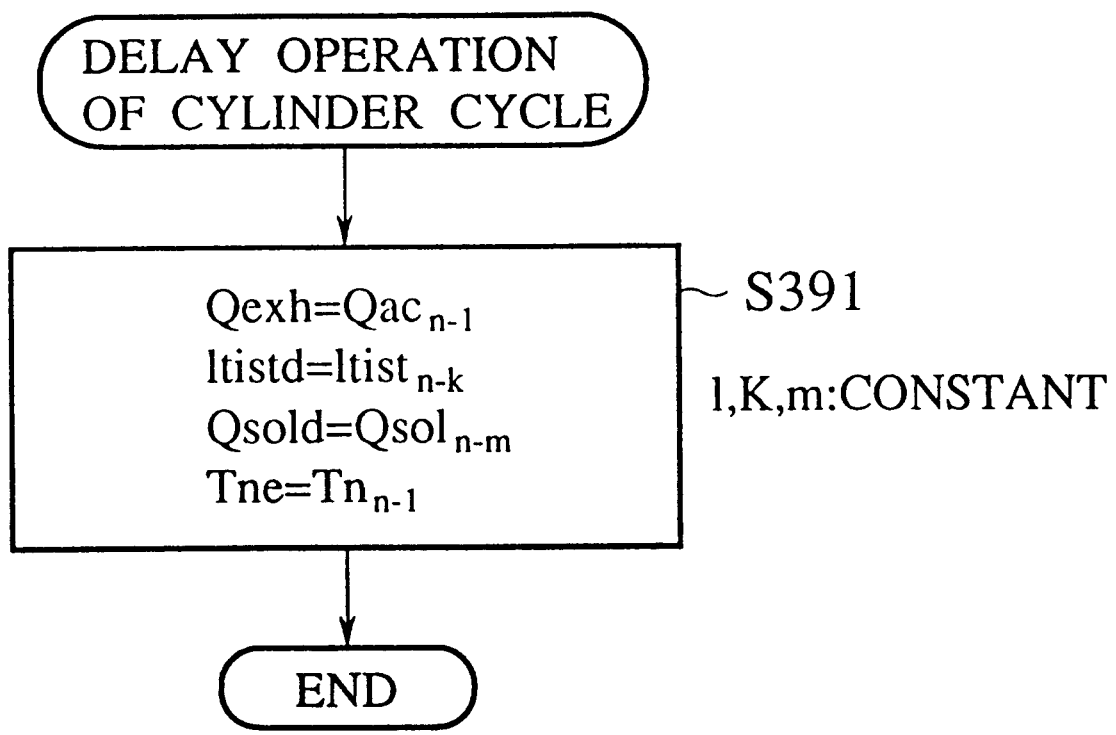
FIG. 39 is a flowchart showing procedures for operating a delay in cylinder cycles.

FIG. 39 is a flow chart for performing a cycle delay (a dead time operation) after sucked to the cylinder and supplied to the cylinder before discharged, in which the dead time operation for a predetermined cycle is performed to each of the intake air amount to cylinder Qac, the actual injection timing Itist, the volume for injecting fuel oil Qsol and the intake air temperature Tn. This is performed for the purpose of obtaining data before sucking to the cylinder which is a base of the exhaust pressure to be determined.

Figure 40:
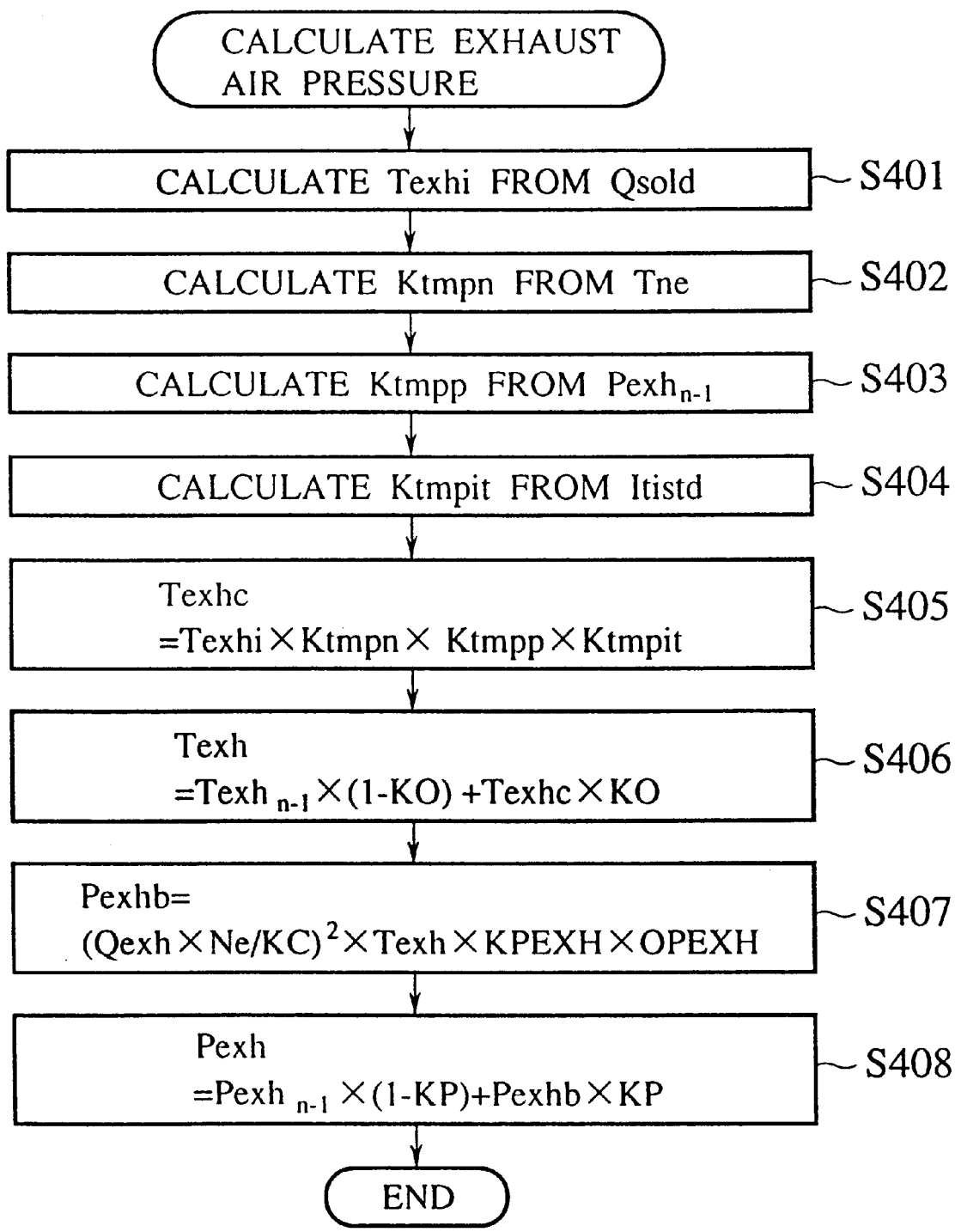
FIG. 40 is a flow chart showing procedures for calculating an exhaust pressure.

FIG. 40 is a flow chart for calculating the exhaust pressure by using the respective values determined in the above manner.

Figure 41:
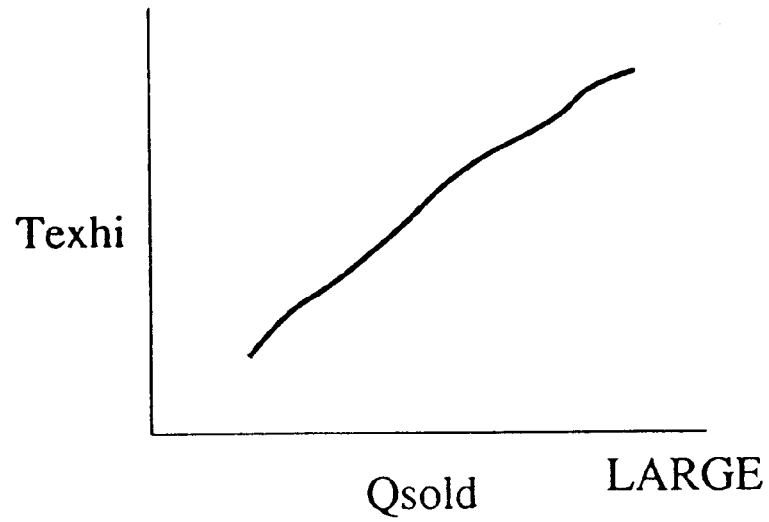
FIG. 41 is a graph showing a table between an operation value for a volume for injecting fuel oil cycle and a standard exhaust air temperature.

In a step S401, a standard exhaust air temperature Texhi is searched from the volume for injecting fuel oil cycle operation value Qsold which is operated in the FIG. 39 by using a table shown in FIG. 41. In this case, the standard exhaust air temperature Texhi has a characteristic of proportionally increasing since a combustion calorie increases together with increase of the volume for injecting fuel oil.

Figure 42:
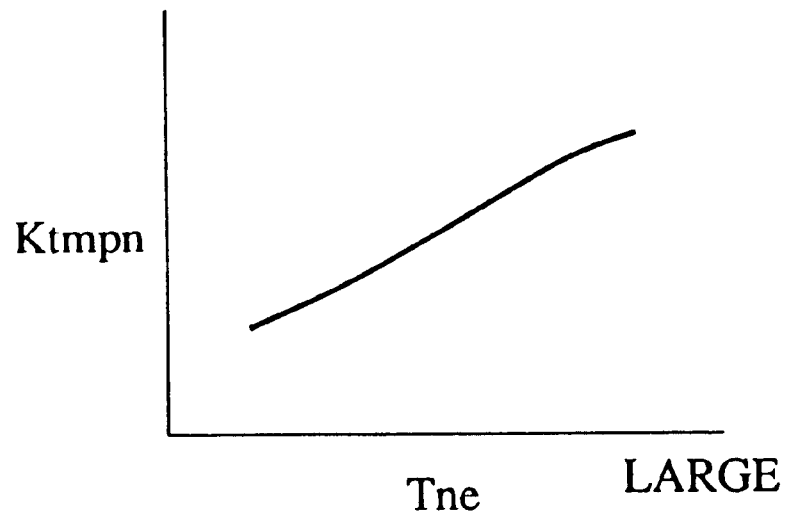
FIG. 42 is a graph showing a table between an operation value for an intake air temperature cycle and an adjustment coefficient for an exhaust air temperature.

In a step S402, an exhaust air temperature adjustment coefficient Ktmpn due to the intake air temperature is searched by the intake air temperature cycle operation value Tne by using a table shown in FIG. 42. In this case, the exhaust air temperature adjustment coefficient Ktmpn has a characteristic of increasing together with increase of the intake air temperature since the temperature in the exhaust air is high when the temperature in the intake air is high.

Figure 43:
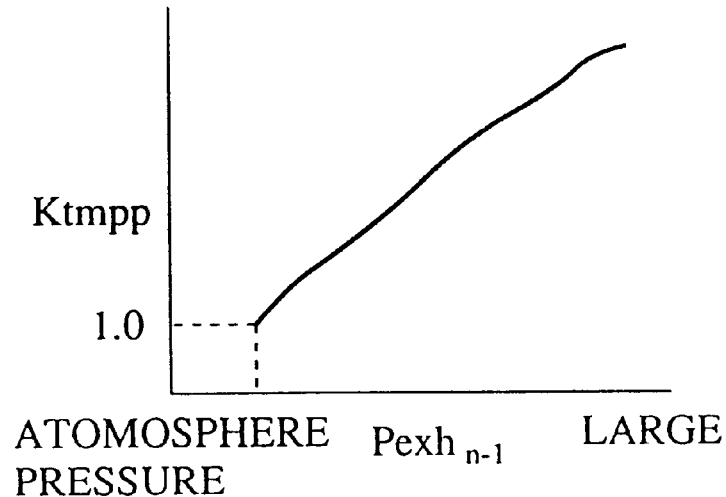
FIG. 43 is a graph showing a table between an exhaust air pressure calculated in a preceding time and an adjustment coefficient for an exhaust air temperature.

In a step S403, an exhaust air temperature adjustment coefficient Ktmpp due to the exhaust air pressure is searched by the exhaust pressure Pexhn−1 calculated in the preceding time by using a table shown in FIG. 43. The exhaust air temperature adjustment coefficient Ktmpp has a suitable characteristic for that the temperature in the exhaust air increases together with increase of the exhaust air pressure.

Figure 44:
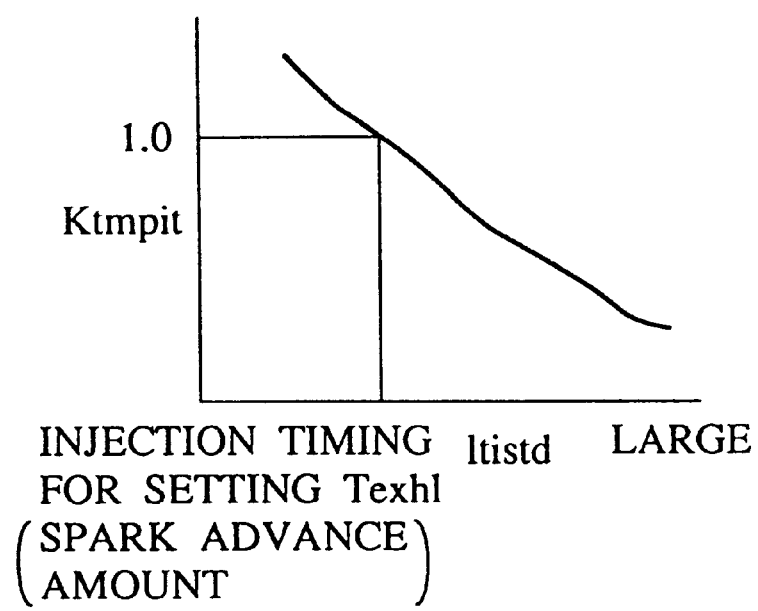
FIG. 44 is a graph showing a table between an operation value for an actual injection timing cycle and an adjustment coefficient for an exhaust air temperature.

In a step S404, an exhaust air temperature adjustment coefficient Ktmpi due to the injection timing is calculated by the actual injection timing cycle operation value Itistd by using a table shown in FIG. 44. The exhaust air temperature adjustment coefficient Ktmpi has a suitable characteristic for that the temperature in the exhaust air increases together with delay of the injection timing because of delay in the combustion finish.

In a step S405, an exhaust temperature from cylinder Texhc is calculated by adjusting the standard exhaust air temperature Texhi which is determined in the step S401 by using the respective exhaust air temperature adjustment coefficient Ktmpn, Ktmpp and Ktmpi which are determined the respective steps S402, S403 and S404 in accordance with the following equation.

$$Texhc = Texhi \times Ktmpn \times Ktmpp \times Ktmpi$$

In a step S406, an exhaust air temperature Texh is determined by performing a primary delay operation as shown in the following equation with respect to the exhaust temperature from cylinder Texhc.

$$Texh = Texh_{n-1} \times (1-KO) + Texhc \times KO$$

in which KO is a constant.

In a step S407, an exhaust pressure standard value Pexhb is calculated by using the exhaust air amount per a cylinder Qexh, the engine speed Ne, the exhaust air temperature Texh and the constants KPEXH and OPEXH (which is a value corresponding to an atmosphere pressure in a standard state) in accordance with the following equation.

$$Pexhb = (Qexh \times Ne/KC)^2 \times Texh \times KPEXH + OPEXH$$

In a step S408, an exhaust air pressure Pexh is determined by performing a primary delay operation as shown in the following equation with respect to the exhaust pressure standard value Pexhb.

$$Pexh = Pexh_{n-1} \times (1-KP) + Pexhb \times KP$$

in which KP is a constant.

Figure 45:
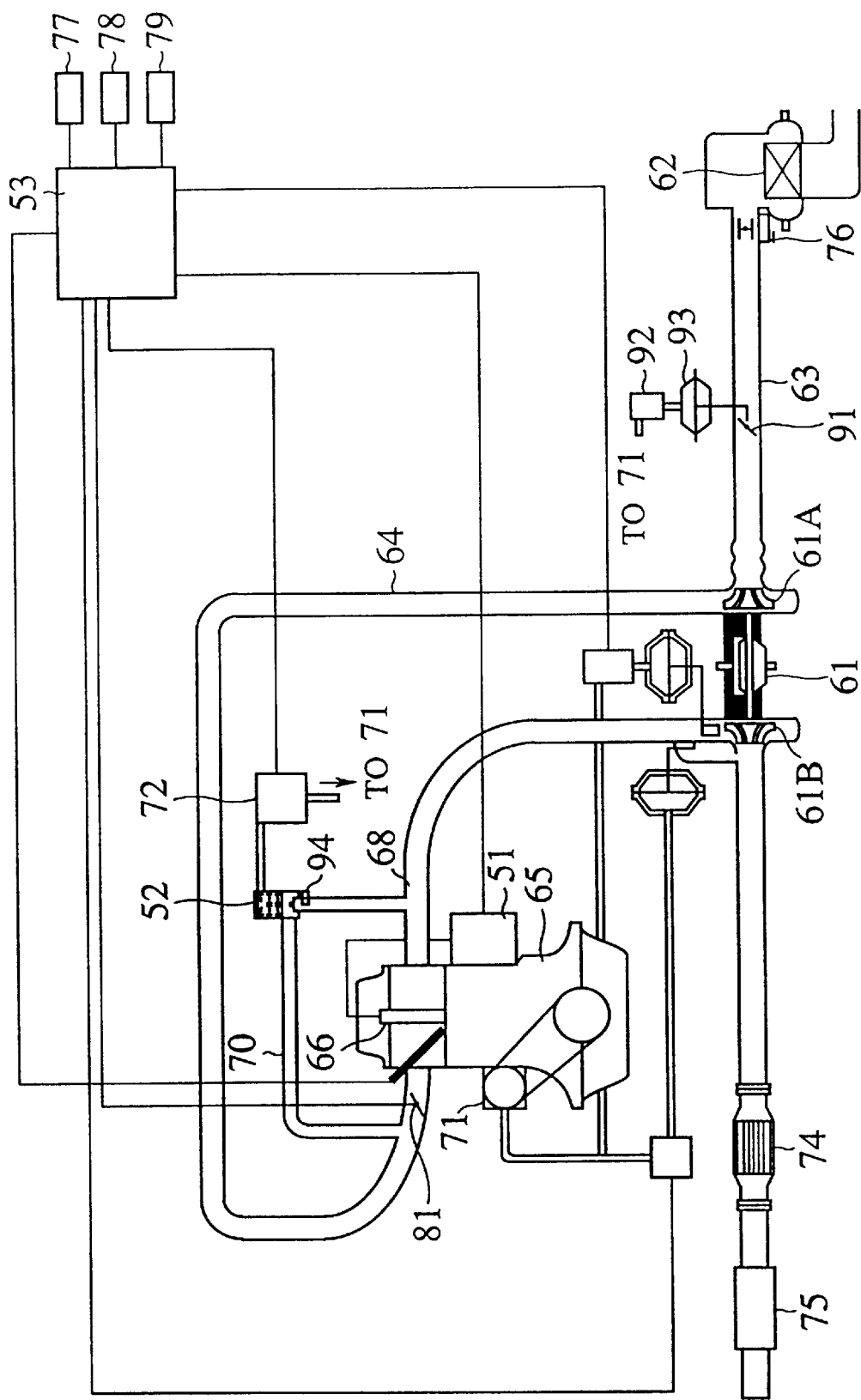
FIG. 45 is a drawing showing a second example of a total structure of an estimation apparatus for estimating a pressure in intake and exhaust systems for an internal combustion engine in accordance with the present invention.

Next, a second example will be explained. In this example, a swirl control valve 81 which strengthen an intake swirl in a low speed driving so as to improve the combustion characteristic is provided in an intake port portion of each of the cylinder of the intake manifold 4 as shown in FIG. 45. The opening degree of the swirl control valve 81 can be controlled by the control unit 53 in accordance with the operating condition of the engine. In the present example, the estimation is performed by adjusting the exhaust air pressure in accordance with the opening degree of the swirl control valve 81.

Figure 46:
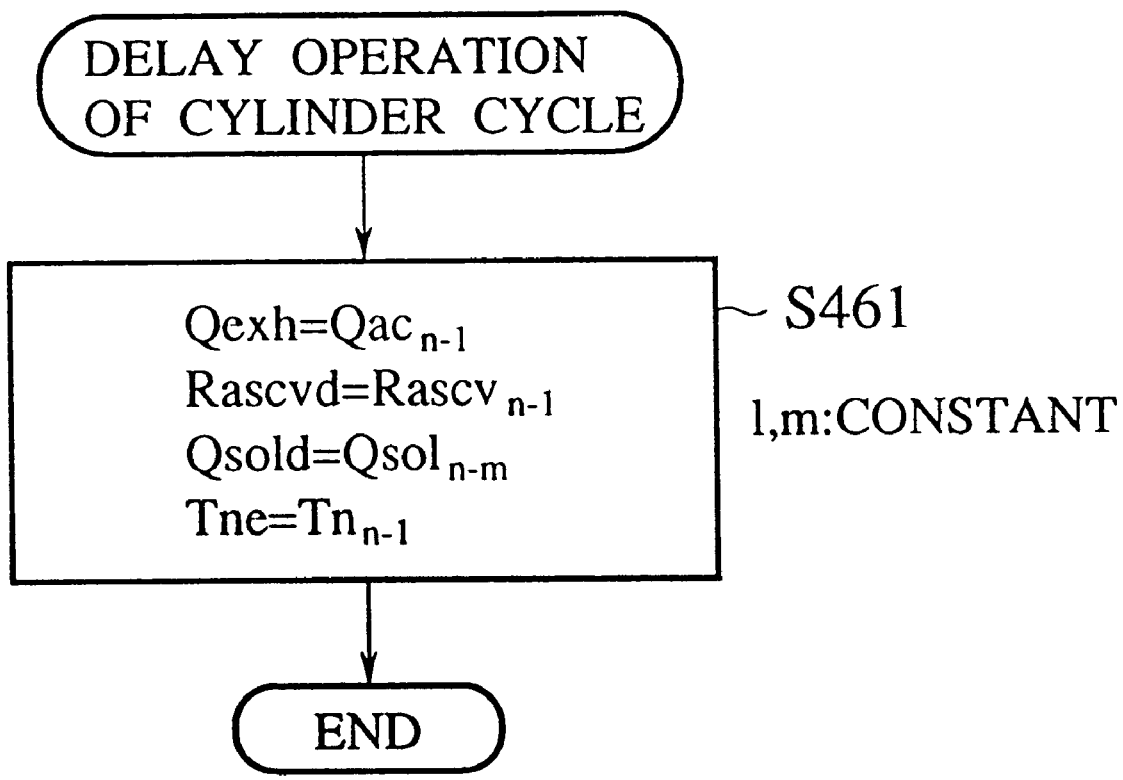
FIG. 46 is a flowchart showing procedures for operating a delay in cylinder cycles.

FIG. 46 is a flow chart for performing a cycle delay (dead time operation) in a similar manner to FIG. 39 and the dead time operation for a predetermined cycle is performed with respect to each of the intake air amount to cylinder Qac, the opening degree of the swirl control valve Rascv, the volume for injecting fuel oil Qsold and the intake air temperature Tne.

Figure 47:
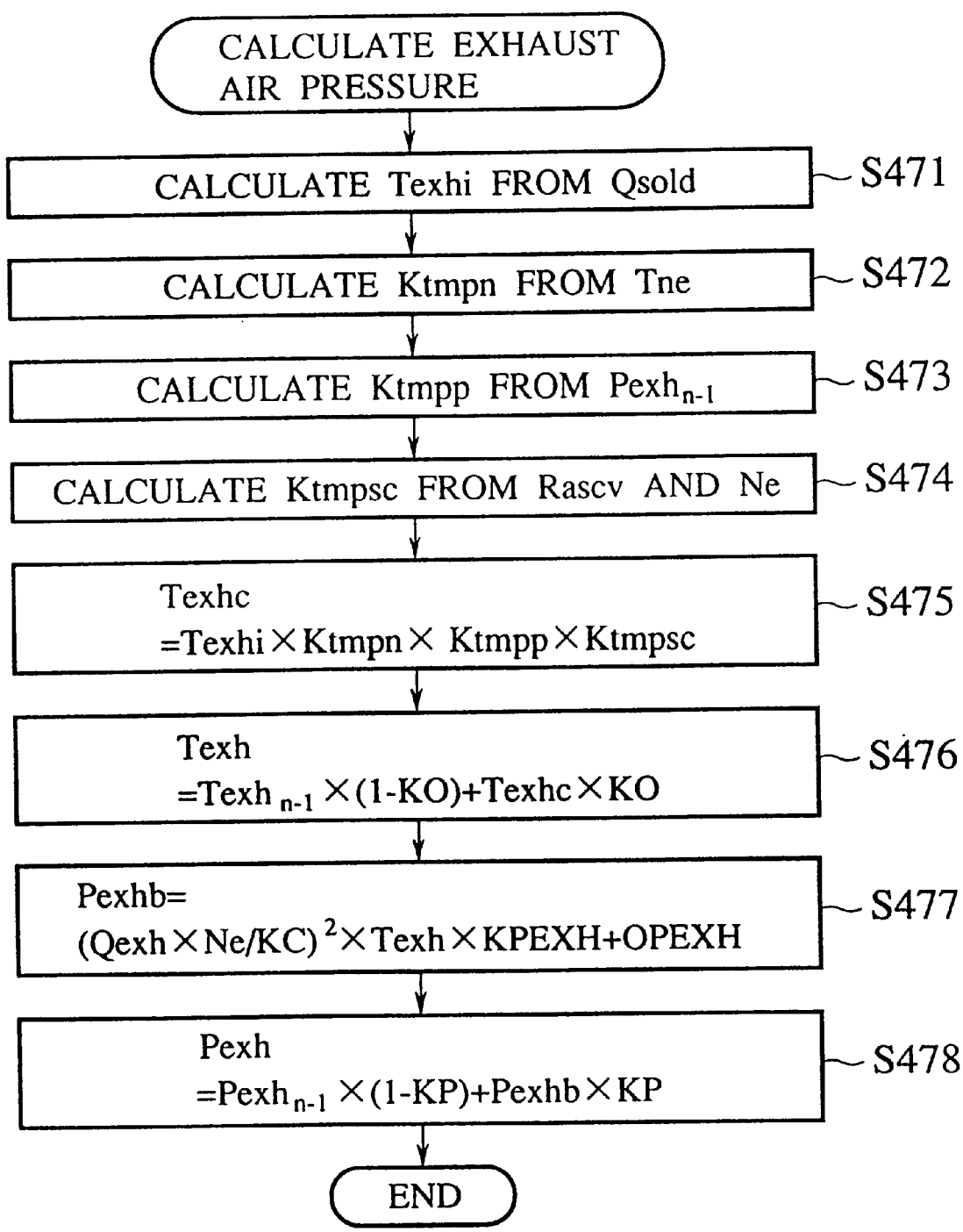
FIG. 47 is a flow chart showing procedures for calculating an exhaust pressure.

FIG. 47 is a flow chart for calculating the exhaust air pressure.

Steps S471 to S473 are the same as the steps S401 to S403 described above so that the explanation thereof is omitted.

Figure 48:
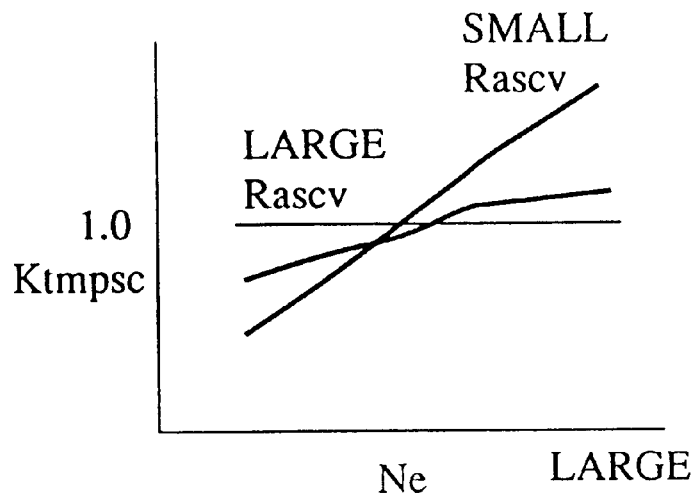
FIG. 48 is a graph showing a table between an engine speed and an adjustment coefficient for an exhaust air temperature.

In a step S474, an exhaust temperature adjustment coefficient Ktmpsc due to the opening degree of the swirl control valve is searched by the swirl control valve opening degree cycle operation value Riscvd in the above FIG. 46 and the engine speed Ne in accordance with a table shown in FIG. 48. In this case, when the swirl control valve 81 is full open (which substantially corresponds to the case where the swirl control valve is not provide), the exhaust temperature adjustment coefficient Ktmpsc equals to 1 and is constant (in which the adjustment is not substantially performed). When the opening degree of the swirl control valve 81 is small, in a low engine speed condition, a suitable swirl strength can be obtained and the combustibility can be improved so that the exhaust air temperature is lowered. However, in a high engine speed condition, due to an excessively large swirl strength the combustibility becomes worse and the intake air amount to cylinder is reduced due to throttling operation so that the exhaust air temperature is risen. Accordingly, the exhaust temperature adjustment coefficient Ktmpsc is set so as to be in conformity with the above characteristics.

In a step S475, an exhaust temperature from cylinder Texhc is calculated by adjusting the standard exhaust air temperature Texhi by using the respective exhaust temperature adjustment coefficient Ktmpn, Ktmpp and Ktmpsc which are respectively determined in the steps S472, S473 and S474 in accordance with the following equation.

$$Texhc = Texhi \times Ktmpn \times Ktmpp \times Ktmpsc$$

Steps S476 to S478 are the same as the steps S406 to S408 in the above FIG. 40. In the step S476, a primary delay operation is performed to the exhaust temperature from cylinder Texhi so as to determine the exhaust air temperature Texh, in the step S477, the exhaust air pressure standard value Pexhb is calculated in accordance with the described equation and in the step S478, a primary delay operation is performed to the exhaust air pressure standard value Pexhb so as to determine the exhaust air pressure Pexh.

Though in the above described embodiment, the exhaust temperature adjustment coefficient Ktmpsc is set by searching from a three dimension table by using the opening degree of the swirl control valve and the engine speed, the exhaust temperature adjustment coefficient Ktmpsc may be set such that a ratio of the intake air flow with respect to the opening degree of the swirl valve, that is, a value Vsc corresponding to the swirl flow speed is calculated by the intake air flow to cylinder Qac, the engine speed Ne and the opening degree of the swirl valve Rascv and the exhaust temperature adjustment coefficient Ktmpsc is determined to be in correspondence with the swirl flow speed corresponding value Vsc.

The following is an embodiment described above.

Figure 49:
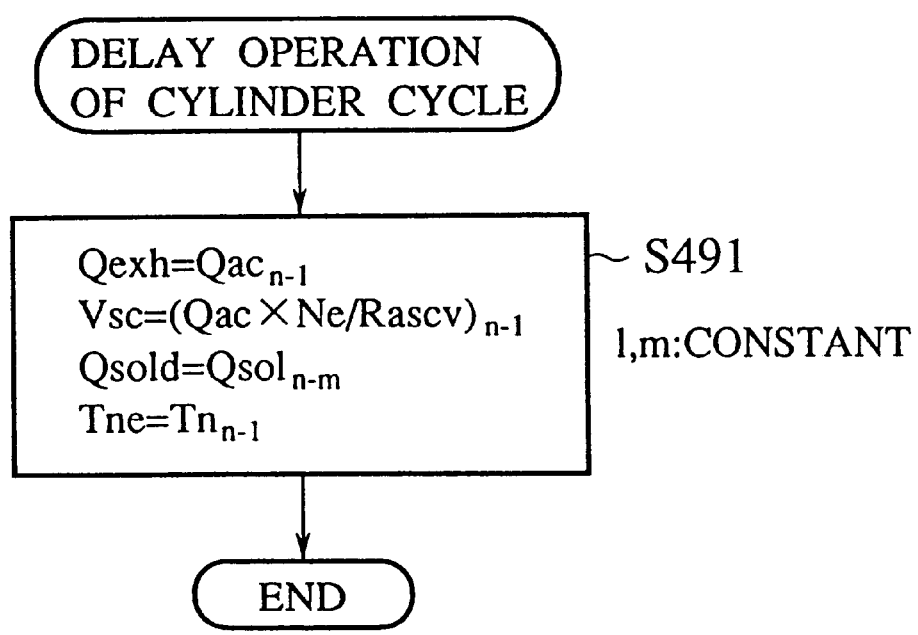
FIG. 49 is a flow chart showing procedures for operating a delay in cylinder cycles.

FIG. 49 is a flow chart for performing a cycle delay (dead time operation) in a similar manner to the above described embodiments and the dead time operation for a predetermined cycle is performed with respect to each of the intake air amount to cylinder Qac, the swirl flow speed Vsc, the volume for injecting fuel oil Qsold and the intake air temperature Tne.

In this case, the swirl flow speed Vsc is determined by dividing the intake air flow Qac×Ne in the cylinder portion as shown in the described equation by the opening degree Rascv of the swirl control valve.

FIG. 50 is a flow chart for calculating the exhaust air pressure.

Steps S501 to S503 are the same as the steps S401 to S403 and the explanation thereof is omitted.

Figure 51:
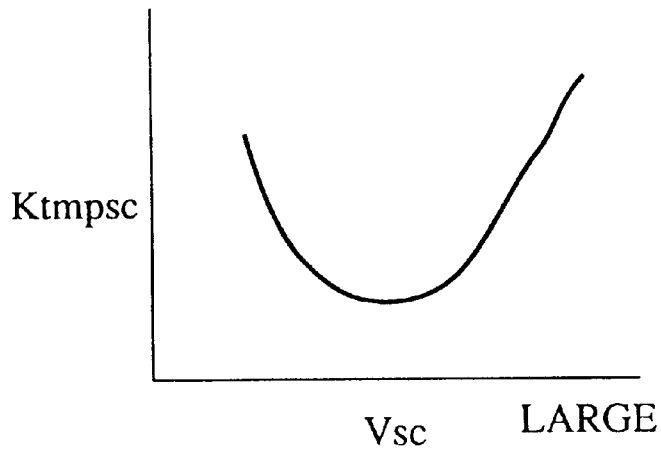
FIG. 51 is a graph showing a table between a value corresponding to a swirl flow speed and an adjustment coefficient for an exhaust air temperature.

In a step S504, an exhaust temperature adjustment coefficient Ktmpsc due to the opening degree of the swirl control valve is searched by using the cycle operation value Vsc corresponding to the swirl flow speed in FIG. 49 in accordance with a table shown in FIG. 51. In this case, the exhaust temperature adjustment coefficient Ktmpsc is set to satisfy the characteristic such that when the swirl flow speed corresponding value Vsc is a certain value, the combustion state is best and the exhaust air temperature is lowered so that the exhaust air temperature rises in a change to both direction from the Vsc.

In a step S505, an exhaust temperature from cylinder Texhc is calculated by adjusting the standard exhaust air temperature Texhi by using each of the exhaust temperature adjustment coefficient Ktmpn, Ktmpp and Ktmpsc which are determined in the steps S502, S503 and S504 in accordance with the described equation.

Steps S506 to S508 are the same as the steps S406 to S408 in the above FIG. 40. In the step S506, a primary delay operation is performed to the exhaust temperature from cylinder Texhc so as to determine the exhaust air temperature Texh, in the step S507, the exhaust air pressure standard value Pexhb is calculated in accordance with the described equation and in the step S508, a primary delay operation is performed to the exhaust air pressure standard value Pexhb so as to determine the exhaust air pressure Pexh.

Next, an embodiment for estimating the intake air pressure in accordance with the present invention will be explained.

Figure 52:
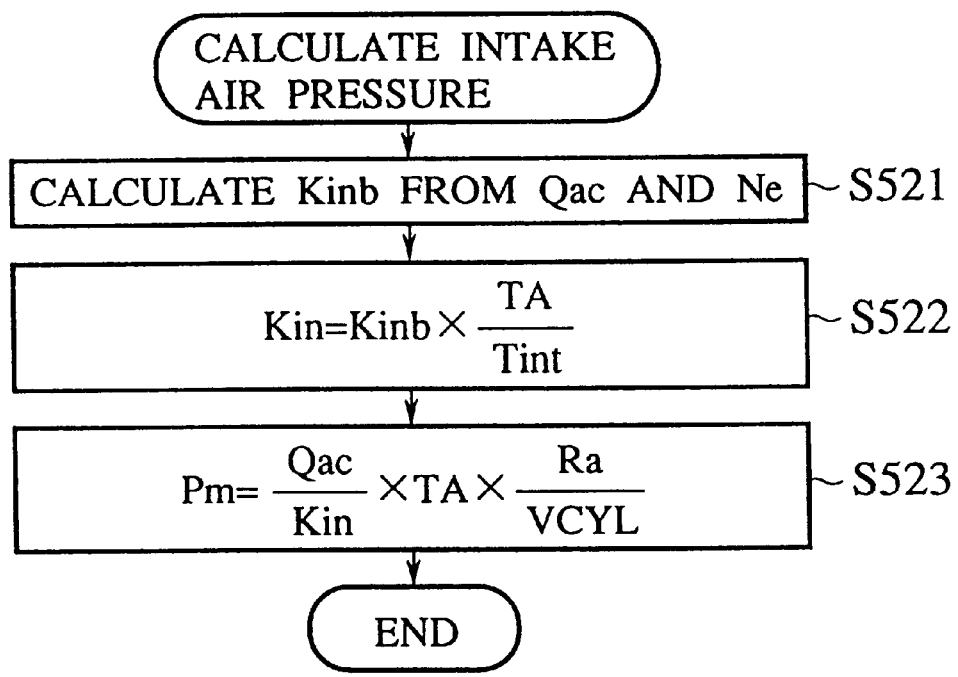
FIG. 52 is a flow chart showing procedures for calculating an intake air pressure.

FIG. 52 is a flow chart for calculating the intake air pressure.

Figure 53:
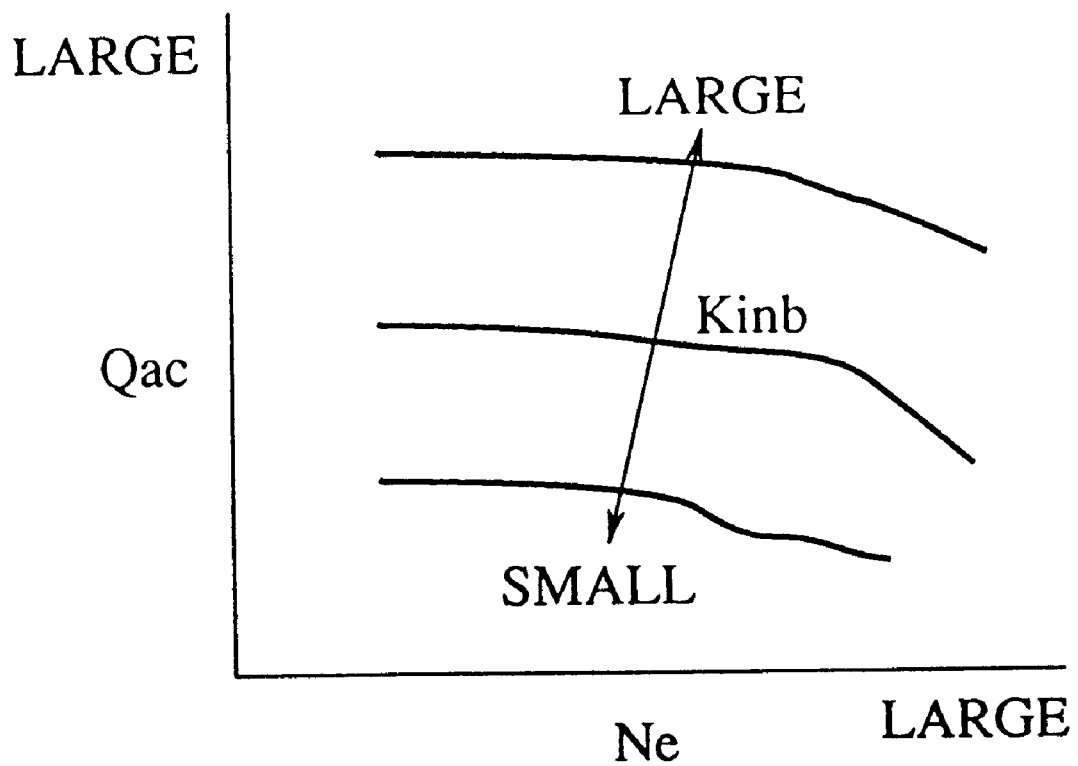
FIG. 53 is a graph showing a table for a standard value corresponding to volumetric efficiency with respect to an engine speed and an intake air volume to a cylinder.

In a step S521, a standard value corresponding to a volumetric efficiency Kinb is searched from a table shown in FIG. 53 by using the intake air amount to cylinder Qac and the engine speed Ne.

In a step S522, the volumetric efficiency corresponding value Kin is calculated by using the intake air temperature Tint in accordance with a described equation (Kin=Kinb× TA/Tint).

In a step S523, an intake air pressure Pm is calculated in accordance with a described equation (Pm=Qac/Kin×TA× Ra/VCYL) by using the intake air amount Qac and the volumetric efficiency corresponding value Kin as variables and the operation is finished. In this case, the constant TA, RA and VCYL in this flow chart respectively mean a temperature in a standard state, an air gas constant and a cylinder volume.

The standard volume for injecting fuel oil Qsol is calculated by the flow chart shown in FIG. 2.

Figure 54:
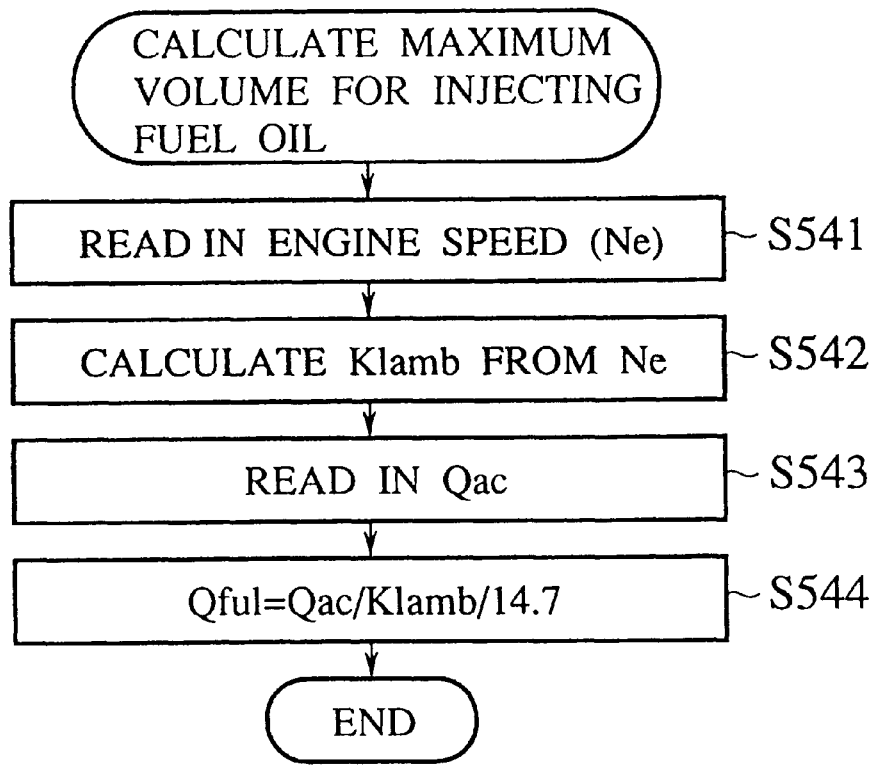
FIG. 54 is a flow chart showing procedures for calculating a maximum volume for injecting fuel oil.

FIG. 54 is a flow chart for calculating a maximum volume for injecting fuel oil Qful and the operation is performed at a timing corresponding to the revolution.

Figure 55:
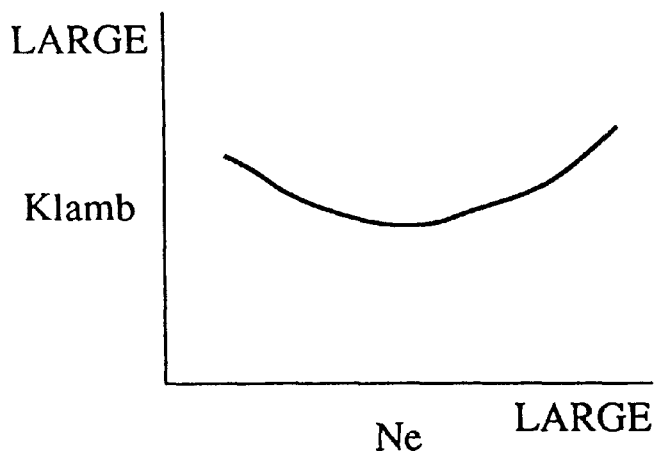
FIG. 55 is a graph showing a table between an engine peed and a value corresponding to a limit air excess rate.

In a step S541, the engine speed Ne is read in and in a step S542, a value Klamb corresponding to a limit air excess rate is searched from a table in which a value corresponding to a smoke limit as shown in FIG. 55 is set by the engine speed Ne.

In a step S543, the intake air amount to cylinder Qac is read in, in step S544, the maximum volume for injecting fuel oil Qful is calculated in accordance with the described equation (Qful=Qac/Klamb/14.7) and the operation is finished.

The volume for injecting fuel oil is finally set in accordance with the flow chart shown in FIG. 25 mentioned above.

The EGR control by using the exhaust air pressure and the intake air pressure estimated by the present invention is performed in a similar manner to the above mentioned manner. Accordingly, the target EGR rate Megr is calculated in accordance with the flow chart shown in FIG. 13 and the complete burning of the engine is determined by the flow chart shown in FIG. 16.

As explained above, in accordance with the present invention, an estimation of pressure which suffers no cost increase and assures durability and transient responsibility can be performed by calculating an exhaust air pressure and an intake air pressure by signals from an air flow meter and the like. Further, an accuracy for estimation is improved and an accuracy for control such as an EGR control is improved by adjusting the exhaust air pressure by an injection timing, a ignition timing, an opening of a swirl control valve and a ratio of an intake flow speed with respect to an opening area.

It should be understood that many modifications and adaptations of the invention will become apparent to those skilled in the art and it is intended to encompass such obvious modifications and changes in the scope of the claims appended hereto.

What is claimed is:

1. An estimation apparatus for estimating a pressure in an exhaust system for an internal combustion engine comprising:

volume for injecting fuel oil detecting means for detecting an injecting amount of a fuel injected to the engine;

intake air temperature detecting means for detecting a temperature of an air sucked to said engine;

fuel injection timing detecting means for detecting an injection timing of said fuel;

intake air flow detecting means for detecting a flow of said intake air;

engine speed detecting means for detecting an engine speed; and exhaust system pressure estimating means for estimating a pressure in an exhaust system on the basis of said volume for injecting fuel oil, said intake air temperature, said fuel injection timing, said intake air flow and said engine speed.

2. An estimation apparatus for estimating a pressure in an exhaust system for an internal combustion engine as recited in claim 1 wherein said exhaust system pressure estimating means calculates the standard exhaust temperature on the basis of said volume for injecting fuel oil, calculates the temperature in the exhaust air discharged from the cylinder by adjusting the standard exhaust temperature by said temperature in the intake air, the preceding estimated pressure in the exhaust system and said fuel injection timing and estimates said pressure in the exhaust system on the basis of the exhaust air flow volume determined by said intake air volume and said engine speed and the temperature in the exhaust air discharged from said cylinder.

3. An estimation apparatus for estimating a pressure in an intake system for an internal combustion engine comprising:

intake air flow volume detecting means for detecting an air flow volume sucked to the engine;

engine speed detecting means for detecting an engine speed;

intake air temperature detecting means for detecting a temperature of said intake air; and intake system pressure estimating means for estimating a pressure in an intake system on the basis of said intake air flow volume, said engine speed and said intake air temperature.

4. An estimation apparatus for estimating a pressure in an intake system for an internal combustion engine as recited in claim 3 wherein said intake system pressure estimating means calculates an intake air volume per a cylinder on the basis of said intake air flow volume and said engine speed, calculates a standard value corresponding to a volumetric efficiency on the basis of the intake air volume per a cylinder and said engine speed, calculates the value corresponding to a volumetric efficiency by adjusting the standard volumetric efficiency correspondence value by said intake air temperature, and estimates said pressure in the intake system on the basis of said intake air volume per a cylinder and said volumetric efficiency correspondence value by using a following equation:

$$Pm = Qac/Kin \times TA \times RA \times VCYL$$

in which Pm means a pressure in the intake system, Qac means an intake air volume per a cylinder, Kin means a corresponding value to a volumetric efficiency, TA means a temperature in a standard state, RA means a constant of air and gas and VCYL means a cylinder volume.

* * * * *